(12) United States Patent
Mukaiya

(10) Patent No.: US 6,853,501 B2
(45) Date of Patent: Feb. 8, 2005

(54) FOCUSING METHOD SELECTABLE ZOOM OPTICAL SYSTEM

(75) Inventor: Hitoshi Mukaiya, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 228 days.

(21) Appl. No.: 10/310,057

(22) Filed: Dec. 5, 2002

(65) Prior Publication Data

US 2003/0137748 A1 Jul. 24, 2003

(30) Foreign Application Priority Data

Jan. 4, 2002 (JP) ........................................ 2002-000107

(51) Int. Cl.[7] .............................................. G02B 15/14
(52) U.S. Cl. ........................ 359/698; 359/687; 396/81
(58) Field of Search ................................. 359/676, 682, 359/684, 685, 687, 698; 396/81, 82

(56) References Cited

U.S. PATENT DOCUMENTS 5,027,147 A * 6/1991 Kaneda ........................ 396/81
5,146,071 A * 9/1992 Ookubo et al. ........... 250/201.2
6,285,154 B1 * 9/2001 Yasuda et al. ............... 318/685
6,553,185 B1 * 4/2003 Inaba et al. .................... 396/85
6,556,356 B2 * 4/2003 Ohtake ........................ 359/687

FOREIGN PATENT DOCUMENTS

JP 56-13287 B2 3/1981
JP 59-71016 A 4/1984

* cited by examiner

Primary Examiner—Huy Mai
(74) Attorney, Agent, or Firm—Fitzpatrick, Cella, Harper & Scinto

(57) ABSTRACT

A zoom optical system capable of selecting different focusing methods is disclosed. This zoom optical system includes a variable power unit that performs a variable power operation while moving during zooming; a first focusing unit positioned in front of the variable power unit; a second focusing unit positioned at the back of the variable power unit; a sensor that detects the position of the first focusing unit; and a memory that stores movement information of the second focusing unit during zooming according to the position of the first focusing unit. Herein, the second focusing unit changes in the moving locus thereof during zooming, based on the position information about the first focusing unit detected by the sensor and the information from the memory.

11 Claims, 15 Drawing Sheets

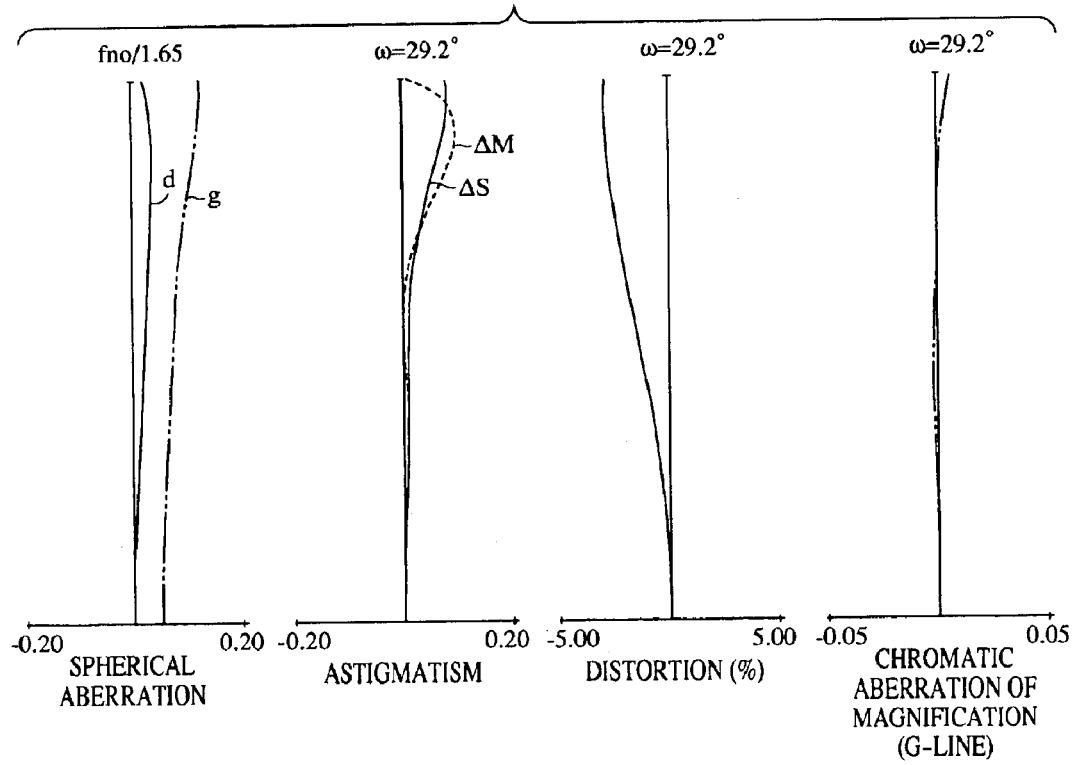
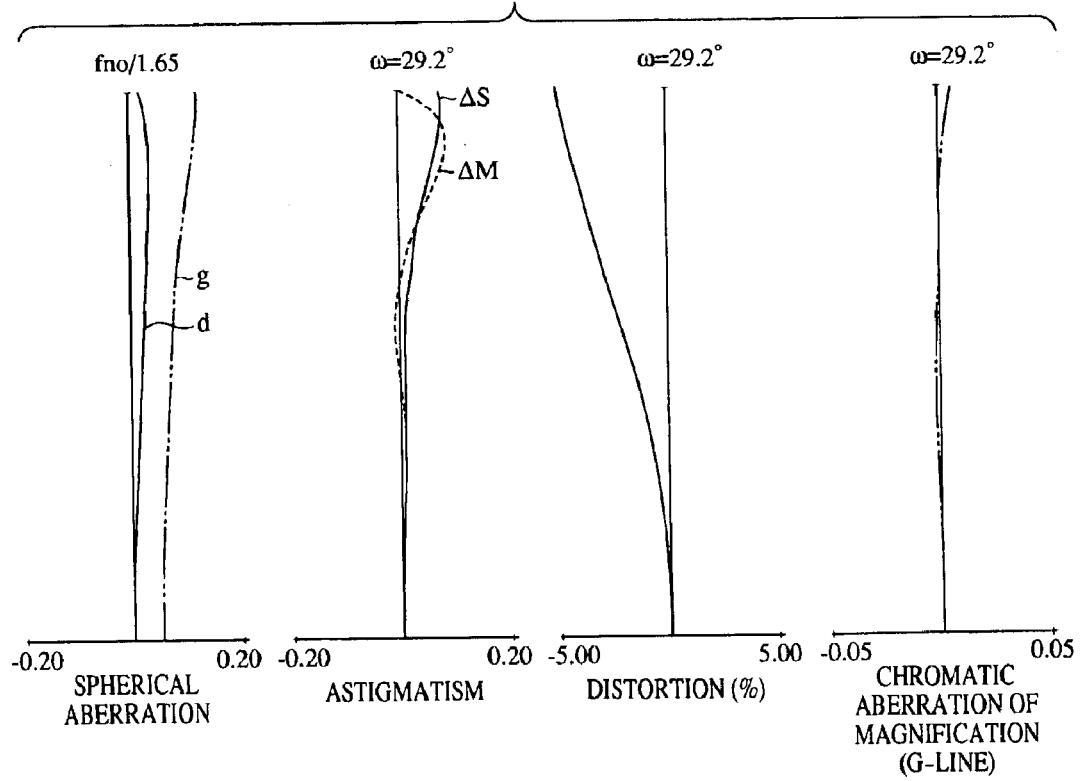

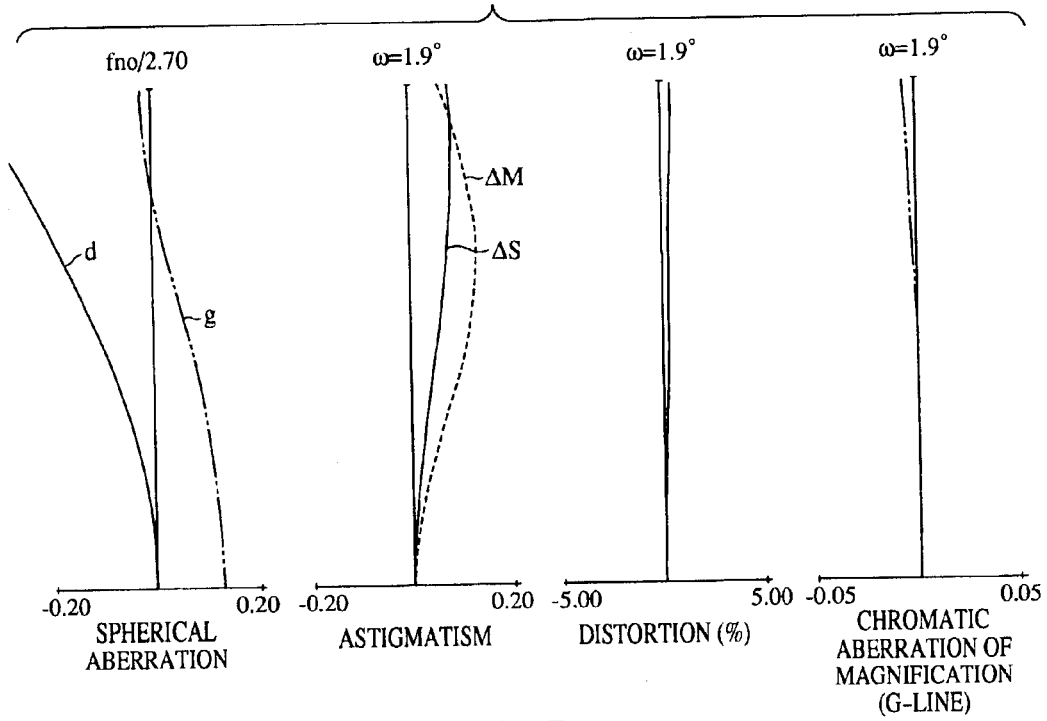
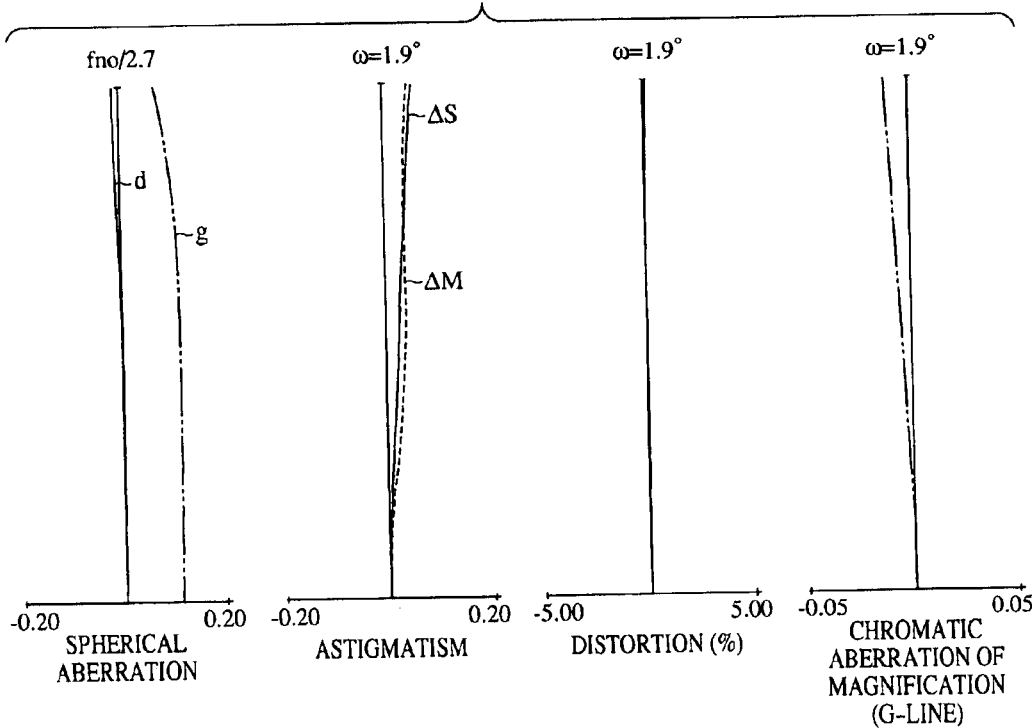

FOCUSING METHOD SELECTABLE ZOOM OPTICAL SYSTEM

BACKGROUND OF THE INVENTION

1. Field of the Invention

The present invention relates to a zoom optical system capable of selecting different focusing methods. More particularly, the present invention relates to a zoom optical system suitable to an optical device such as a video camera, a digital camera, a still camera, or a television camera.

2. Description of the Related Art

Hitherto, various focusing methods have been used for zoom lenses used in optical devices such as video cameras, digital cameras, television cameras, etc.

Some zoom lenses in video cameras and the like allows switching between the manual focus method and the auto focus method.

Focusing methods are broadly categorized into the front-lens focusing method, the front-lens inner focusing method (these two are collectively referred to as a "front focusing method"), and the compensation focusing method and the rear focusing method (these two are collectively referred to as a "rear focusing method"), based on whether a lens unit in front of a variable power unit is used, or a lens unit at the back of the variable power unit is used. The front focusing method is a method in which a focusing lens unit positioned in front of the variable power unit (i.e., on the object side) is moved so as to always keep the image position thereof at a fixed position irrespective of the subject distance. Therefore, the position of the focus lens unit is determined only by the object distance, and is irrelevant to the variable power operation (or zoom position), and hence, even if a high-speed variable power operation is performed, fluctuations of an image surface do not occur.

However, since a large front lens unit is moved, the moving amount thereof is naturally limited, and the effective diameter of the focusing lens unit increases. The photographable subject distance, therefore, is the same through the entire zooming region, but the minimum subject distance is substantially 1 m to 60 cm at the best. Under such circumstances, an arrangement is known in which, in such a front focusing method, one end of the cam in a variable power lens system is used for macro photographing, thereby allowing close-up photographing (macro photographing). However, in this method, because one end of the continuous portion of the variable power cam is used, it has been impossible to perform a variable power operation during macro photographing.

Japanese Patent Publication No. 56-13287 proposes a method enabling close-up photographing. However, because the mechanism of moving lens unit in this method is complicated, this method is unsuited for zoom lenses used in a compact video camera or the like.

On the other hand, the rear focusing method is generally capable of photographing an object at a range closer than the front focusing method. Particularly at a wide angle end, the moving amount of the focusing lens unit is minute, so that the rear focusing lens units have an advantage in their capability of close-up photographing, and are frequently used as consumer-oriented appliances.

However, in the rear focusing method, the moving amount of the focusing lens unit varies depending on the zoom position when it focuses on an object at a predetermined distance, and therefore, when zooming is to be performed, it is necessary to control the movement of the focusing lens unit by computation based on an enormous amount of movement information tables stored in a microcomputer or the like in advance. Therefore, when high-speed zooming is performed, or when subject distances are diversely varied while zooming, the driving of the focusing lens unit could not follow. Accordingly, in order to prevent blurs caused by this incapability of following, a limitation has been imposed on the zooming speed. As a result, at photo opportunities, the intension of a photographer might not be sufficiently reflected.

Japanese Patent Laid-Open No. 59-71016 proposes a focusing method in which focusing is performed by moving some of image forming lenses, in a macro mechanism where a focus adjustment (tracking adjustment) between zoom lenses and the image forming surface of a camera is made when the zoom lenses are attached to a video camera, and close-up photographing is implemented. In this Japanese Patent Open-Laid No. 59-71016, during close-up photographing (macro photographing), focusing is performed by moving some or all of the image forming lenses. In this case, therefore, a zooming operation in a macro photographing state will cause defocusing.

As described above, the front focusing method involves a problem in that it is difficult to allow photographing continuously from an object at an infinite distance to an object in close proximity. On the other hand, the rear focusing method involves a problem in that it is difficult to follow a variable power operation at a high speed.

SUMMARY OF THE INVENTION

It is an object of the present invention to provide a zoom optical system capable of focusing on objects ranging from objects at an infinite distance to objects in close proximity, and of following even to quick zooming.

A zoom optical system as an embodiment according to the present invention includes a variable power unit that performs a variable power operation while moving during zooming; a first focusing unit positioned in front of the variable power unit; a second focusing unit positioned at the back of the variable power unit; a sensor that detects the position of the first focusing unit; and a memory that stores the movement information about the second focusing unit during zooming according to the position of the first focusing unit. Herein, the second focusing unit changes in the moving locus thereof during zooming, based on the position information about the first focusing unit detected by the sensor and the information from the memory.

Further objects, features and advantages of the present invention will become apparent from the following description of the preferred embodiments with reference to the attached drawings.

BRIEF DESCRIPTION OF THE DRAWINGS

FIG. 4 shows aberrations at a wide angle end when focusing (object distance: 3 m) was performed by a first lens unit in the zoom lenses according to the first embodiment.

FIG. 5 shows aberrations at the wide angle end when focusing (object distance: 3 m) was performed by a fifth lens unit in the zoom lenses according to the first embodiment.

FIG. 6 shows aberrations at a telephoto end when focusing (object distance: 3 m) was performed by the first lens unit in the zoom lenses according to the first embodiment.

FIG. 7 shows aberrations at the telephoto end when focusing (object distance: 3 m) was performed by the fifth lens unit in the zoom lenses according to the first embodiment.

DESCRIPTION OF THE PREFERRED EMBODIMENTS

Hereinafter, the embodiments according to the present invention will be described with reference to the attached drawings.

Figure 1:
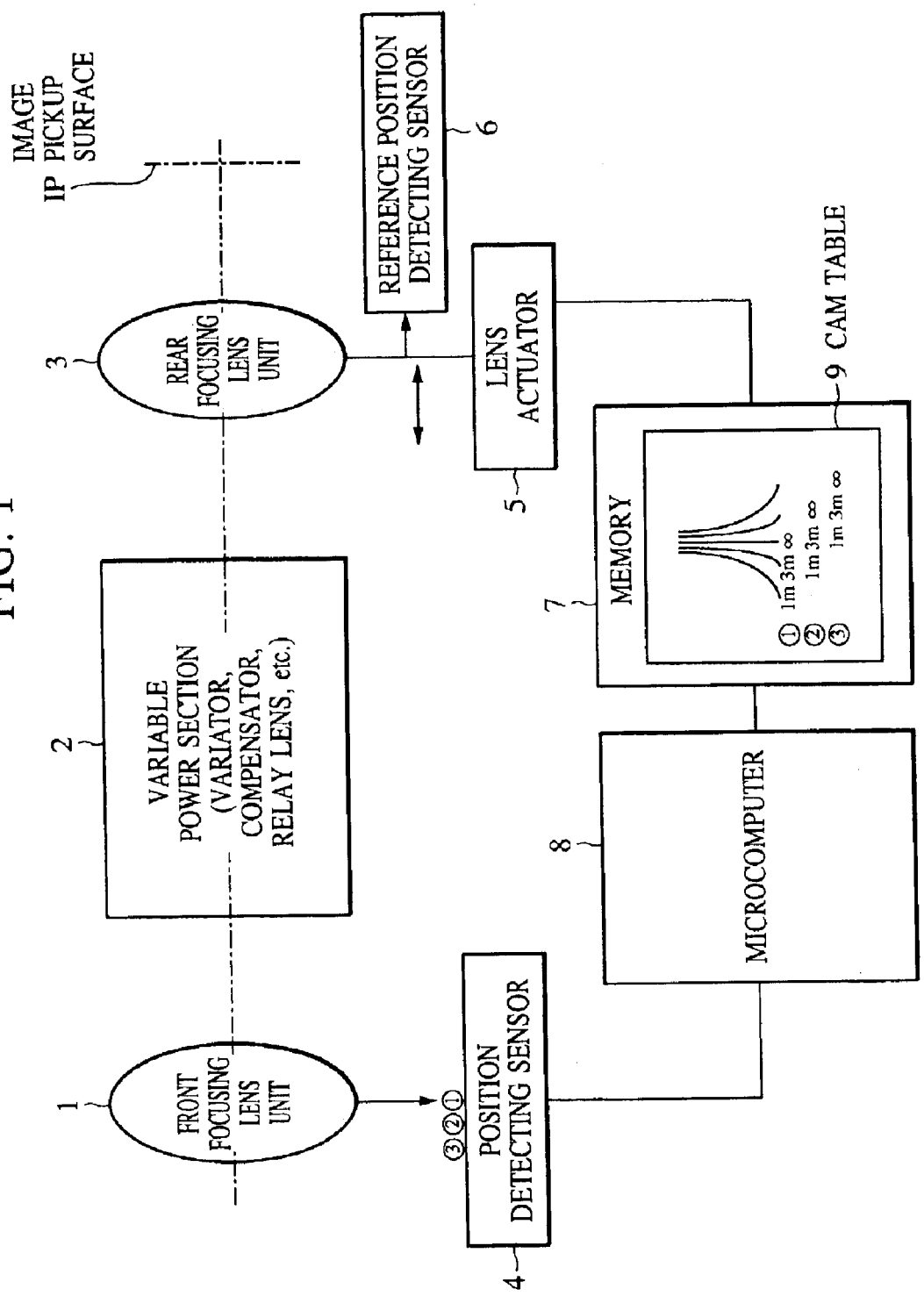
FIG. 1 is a schematic construction view showing a zoom optical system according to the present invention.

FIG. 1 is a schematic view showing the basic construction of a zoom optical system (zoom lenses) according to the present invention. The zoom lens in the present invention has an arrangement such that a lens unit positioned in front of a variable power unit (i.e., on the object side) and a lens unit positioned at the back of the variable power unit (i.e., on the image side) can be selectably used as a focusing lens unit. The method by which different focusing lens units can be selected in this manner is hereinafter referred to as a "hybrid focusing method" in the present description.

Referring to FIG. 1, reference numeral 1 denotes a front focusing lens unit, and reference numeral 2 denotes a variable power section. The variable power section 2 comprises a variator for performing a variable power operation, a compensator for compensating for fluctuations of an image surface caused by the variable power operation, and a relay lens for leading luminous flux from a compensator to a subsequent lens unit, and the like. Reference numeral 3 denotes a rear focus lens unit. IP denotes an image pickup surface, where image pickup means (a photosensitive film and a solid state image pickup device such as a CCD (Charge-Coupled Device) or a CMOS (Complementary Metal Oxide Semiconductor) device) are provided.

Reference numeral 4 denotes a position detecting sensor for detecting the position of the front focusing lens unit 1 on the optical axis, reference numeral 5 denotes an actuator for moving the rear focusing lens unit 3 along the optical axis, reference numeral 6 denotes a reference position detecting sensor for detecting the position of the rear focusing lens unit 3 on the optical axis, reference numeral 7 a memory for storing movement information about the rear focusing lens unit 3 in advance during zooming, and reference numeral 8 denotes a microcomputer, which controls various operations (those of the position detecting sensor 4 and the actuator 5). Reference numeral 9 denotes movement information about the rear focusing lens unit 3, which is stored in the aforementioned memory 7. The movement information 9 includes information about respective plural moving loci corresponding to the position of the front focusing lens unit 1 and the subject distance. The rear focusing lens unit 3 is not necessarily moved by a cam mechanism, but because the moving locus thereof corresponds to the shape of the cam, the moving locus thereof is hereinafter referred to as a "cam locus", and the movement information 9 stored about the cam loci is hereinafter referred to as a "cam table".

In FIG. 1, the variable power section 2 and the rear focusing lens unit 3 are depicted as being separated members, but all or one portion of the variable power section 2 positioned at the back of the variator, which is a variable power unit, may be regarded as the rear focus lens unit 3. Specifically, the compensator and/or the relay lens may be regarded as the rear focusing lens unit 3. In this case, it follows that the rear focus lens unit 3 constitutes one portion of the variable power section 2. Also, in some zooming types, the variator for performing a variable power operation and the compensator for compensating fluctuations of an image surface caused by the variable power operation can not be distinguished from each other. In such zooming types, the lens unit at the back of the lens unit that performs the main variable power operation, (i.e., the lens unit of which the variation in the magnification is largest), can be regarded as the rear focusing lens unit in the present invention.

In the hybrid focusing method according to this embodiment, an AF switch (not shown) switches between a manual focus mode and an auto focus mode. When the manual focus mode is selected by the AF switch, a focusing operation is performed by manually moving the front focus lens unit 1, while, when the auto focus mode is selected, a focusing operation is performed by automatically moving the rear focus lens unit 3 based on the output of a focus detecting device. One possible focus detecting device is such that determines whether an in-focus state has been attained by the microcomputer 8 based on contrast information from the solid state image pickup device placed on the image pickup surface IP. Alternatively, while not showed in FIG. 1, an active type focus detecting device having a light projecting system and a light receiving system, or a phase difference detecting type device that detects the deviation of an image that has past different pupil positions, may be provided separately. During zooming in the case where the auto focus mode is selected, based on position information ①, ②, ③ about the front focus lens unit 1 in the optical axis direction, a cam locus suited for the position information is selected from a cam table by the microcomputer 8, and after the moving amount of the rear focusing lens unit 3 has been computed so that fluctuations of an image surface caused by the variable power operation does not occur, the rear focusing lens unit 3 is moved.

Figure 2A:
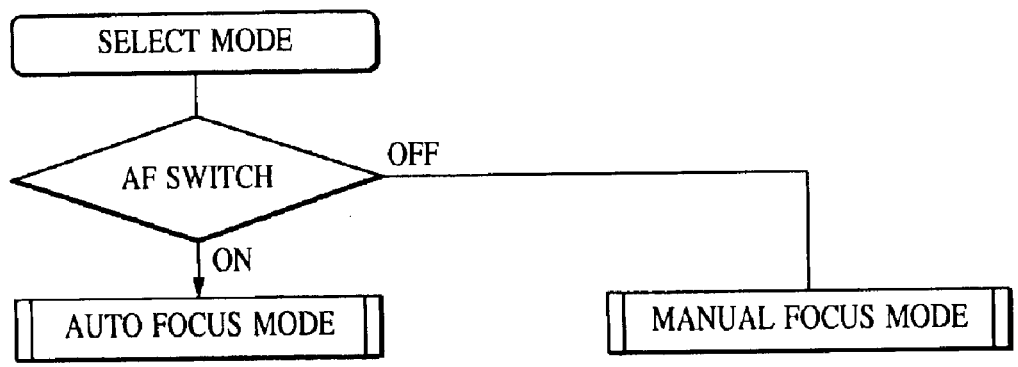
FIGS. 2A to 2C are flowcharts of a hybrid focus system.
Figure 2B:
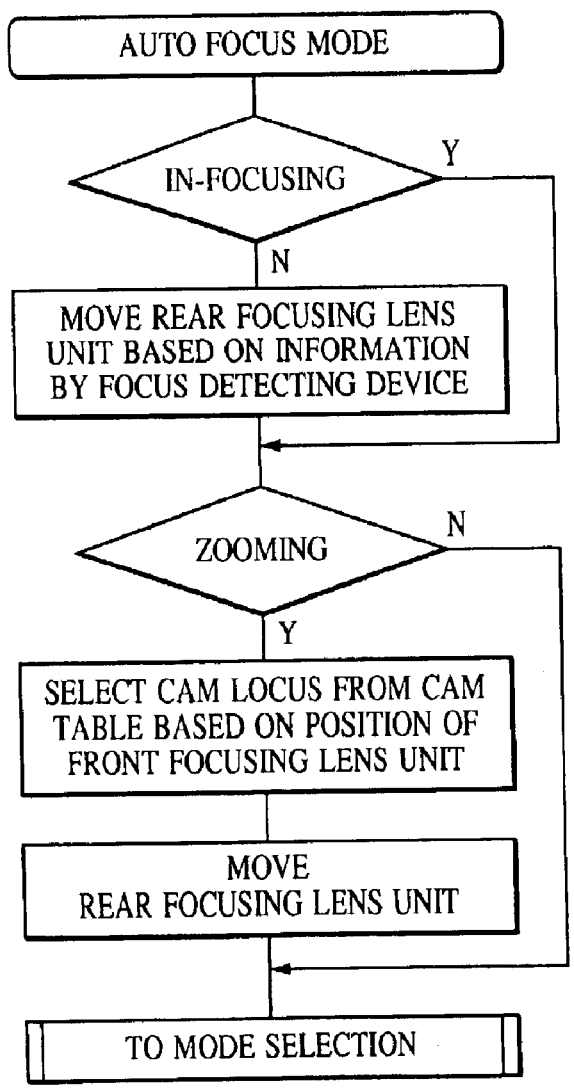
Figure 2C:
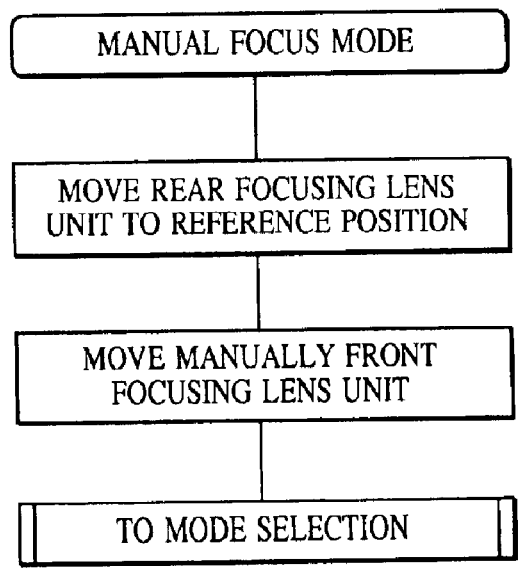

FIGS. 2A to 2C are flowcharts when hybrid focusing is performed. FIG. 2A represents a flow when a focusing mode is selected. If the AF switch is in an ON-state, the process is moved to the auto focus mode, while if the AF switch is in an OFF-state, the process is moved to the manual focus mode.

FIGS. 2B and 2C are detailed flowcharts of the auto focus mode and the manual focus mode, respectively. In the auto focus mode, firstly a focusing operation is performed by automatically moving the rear focusing lens unit 3 based on information from the focus detecting device. When the rear focusing lens unit 3 has already focused on a desired subject, this operation is omitted. When zooming operations are to be performed in succession, an appropriate moving locus is selected from the cam table by the microcomputer 8 based on position information about the front focusing lens unit 1 (if there is no appropriate movement locus, the moving locus is complimented by computation). Then, the rear focusing lens unit 3 is moved, thereby compensating for fluctuations of an image surface caused by a variable power operation.

On the other hand, in the manual focus mode, firstly the rear focusing lens unit 3 is moved to the reference position. Then, focusing is performed by manually moving the front focusing lens unit 1. The reason why the rear focusing lens unit 3 is moved to the reference position as a first step in the manual focus mode is because, some position of the rear focusing lens unit 3, might not allow manual focusing to be performed.

Next, specific embodiments of zoom lenses using the hybrid focusing method will be described below. FIGS. 3, 8, 13, and 18 are sectional view showing zoom lenses in first to fourth embodiments according to the present invention. In these lens sectional view, A, B, and C represents states at a wide angle end, at an intermediate zoom position, and at a telephoto end, respectively. In FIGS. 3, 8, 13, and 18, Li designates an i-th lens unit, SP designates an aperture stop, and G designates a filter corresponding to an infrared cut filter, an optical low pass filter or the like, or an optical member corresponding to a prism or the like. IP designates an image pickup surface.

FIGS. 4, 9, 14, and 19 show aberrations at a wide angle end when focusing (object distance: 3 m) was performed by the front focusing lens unit (a first lens unit) in the zoom lenses according to the first to fourth embodiments. FIGS. 5, 10, 15, and 20 show aberrations at the wide angle end when focusing (object distance: 3 m) was performed by the rear focusing lens unit (a fifth or fourth lens unit) in the zoom lenses according to the first to fourth embodiments. FIGS. 6, 11, 16, and 21 show aberrations at a telephoto end when focusing (object distance: 3 m) was performed by the front focusing lens unit (the first lens unit) in the zoom lenses according to the first to fourth embodiments. Also, FIGS. 7, 12, 17, and 22 show aberrations at the telephoto end when focusing (object distance: 3 m) was performed by the rear focusing lens unit (the fifth or fourth lens unit) in the zoom lenses according to the first to fourth embodiments.

First Embodiment

Figure 3A:
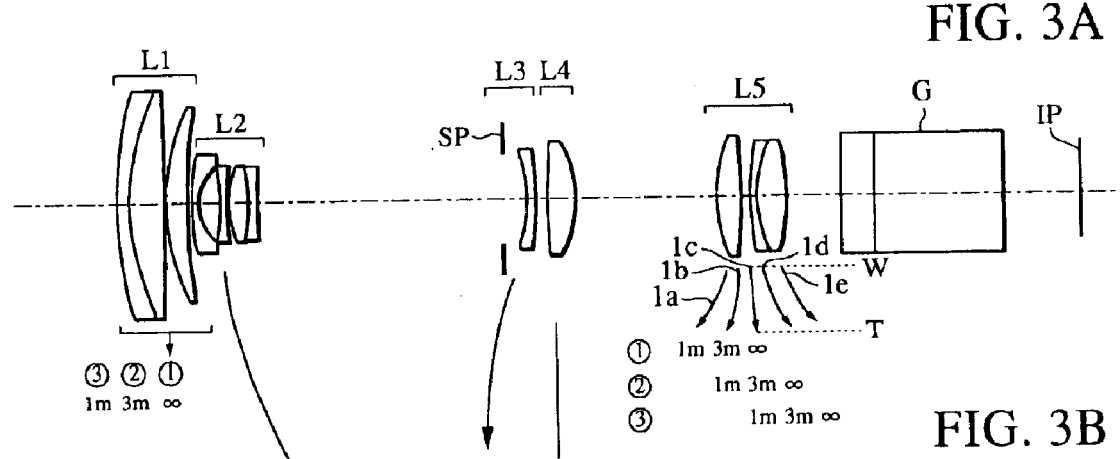
FIGS. 3A to 3C show sections of zoom lenses according to a first embodiment of the present invention, in which a description of a cam table of a rear focusing lens unit is included.
Figure 3B:
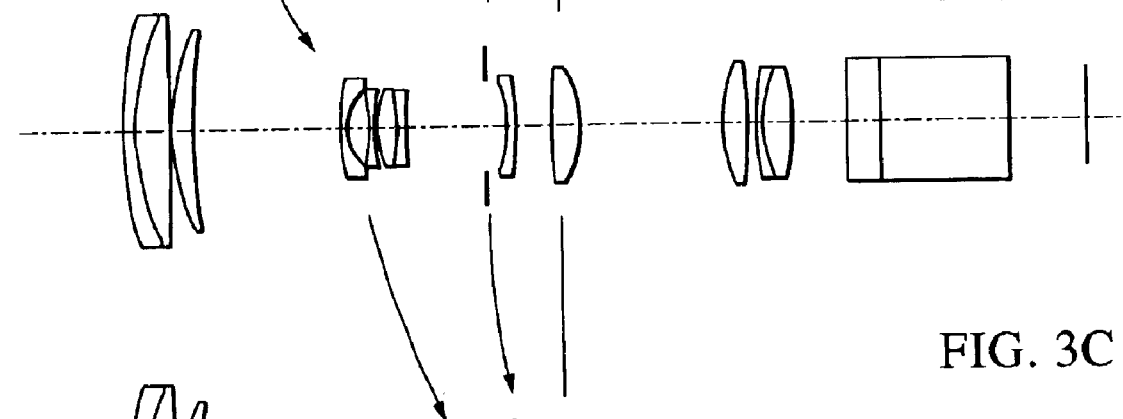
Figure 3C:
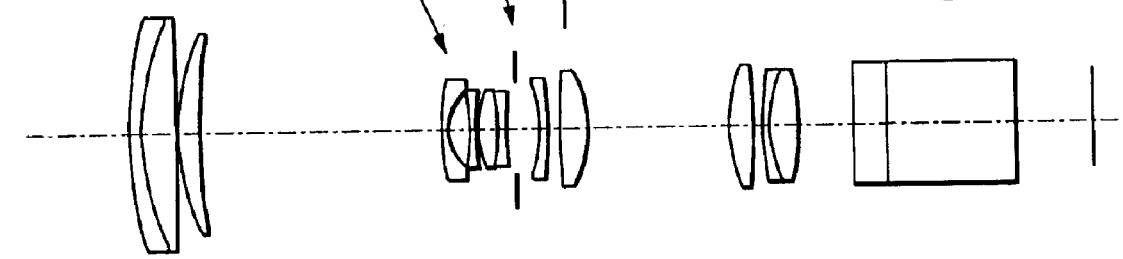

The first embodiment shown in FIGS. 3A to 3C includes, in order from the object side, a first lens unit L1 with a positive refractive power, a second lens unit L2 with a negative refractive power, a third lens unit L3 with a negative refractive power, a fourth lens unit L4 with a positive refractive power, and a fifth lens unit L5 with a positive refractive power. The first lens unit L1 has a structure capable of moving along the optical axis for focusing. The second lens unit L2 and the third lens unit L3 move along the optical axis as indicated by the respective arrows in FIGS. 3A to 3C, for a variable power operation and for compensating for fluctuations of an image surface caused by the variable power operation, respectively. The fourth lens unit L4 causes divergent bundle of rays from the third lens unit L3 to be substantially afocal. The fifth lens unit L5 has a function of forming an image on the image pickup surface IP, and has a structure capable of moving along the optical axis for focusing.

Furthermore, the first lens unit L1 is provided with the position detecting sensor 4 described with reference to FIG. 1. The position detecting sensor 4 notifies the microcomputer 8 of the "subject distance" position on which the first lens unit L1 is focusing.

In the manual focusing mode, a method is adopted in which the first lens unit L1 is moved. Since the first lens unit L1 is positioned in front of the second lens unit L2 as a variable power lens unit, the zoom position and the position of the first lens unit L1 on the optical axis are quite individual from each other, and given the same subject distance, the position of the first lens unit L1 on the optical axis is the same wherever the zoom position may be. On the other hand, in the auto focus mode, focusing is performed by moving the fifth lens unit L5 based on information from the focus detecting device. When zooming is to be performed in the auto focus mode, an appropriate moving locus is selected from the cam table 9 based on the position information about the first lens unit L1 on the optical axis.

In FIG. 3A, ①, ②, and ③ represent the positions of the first lens unit L1 when it is focusing on three subjects at different distances: an infinite distance, an object distance of 3 m, and an object distance of 1 m, respectively (these position values are ones when the unit of the numerical examples described later is represented by mm. The same shall apply hereinafter). In this embodiment, five cam loci 1a to 1e are prepared as the cam table 9 for the fifth lens unit L5. Here, 1a to 1c denote the cam loci corresponding to the position ①, 1b to 1d denote those corresponding to the position ②, and 1c to 1e denote those corresponding to the position ③. Specifically, in the case where the first lens unit L1 is focused on an object at an infinite distance in the manual focus mode and is fixed, and where the manual mode is then switched to the auto focus mode, the information ① is transferred to the microcomputer 8 by the position detecting sensor 4, and during zooming, the fifth lens unit L5 is moved by using some of the cam loci 1a to 1c corresponding to the position ①, as control information. In this situation, therefore, the fifth lens unit L5 constitutes the cam locus 1c with respect to an object at an infinite distance, and does not move along the optical axis during zooming. However, as the subject comes closer in a manner such as to be at an object distance of 3 m and further 1 m, the fifth lens unit L5 is extended (i.e., moved toward the object side), thereby increasing the moving amount during zooming as shown by the cam loci 1b and 1a.

Depending on the zoom position, the moving amount (extending amount) of the fifth lens unit L5 during focusing varies, and becomes the smallest at the wide angle end, and becomes the largest at the telephoto end.

In the case where the first lens unit L1 is focused on an object at a distance of 3 m in the manual focus mode and is fixed, and where the manual mode is then switched to the auto focus mode, some of the cam loci 1b to 1d corresponding to the position information ② is selected. When the object distance is left at 3 m, the cam locus becomes 1c, and the fifth lens unit L5 does not move during zooming. However, when focusing is attempted with the fifth lens unit L5, and the fifth lens unit L5 is focused on a subject at a distance other than 3 m, for example, at an infinite distance, it is necessary to move the fifth lens unit L5 to the image pickup surface IP side with the cam locus 1d. Herein, the closer the fifth lens unit L5 gets to the telephoto end, the larger the required moving amount thereof becomes. Conversely, when focusing is attempted with the fifth lens unit L5, and the fifth lens unit L5 is focused on a subject at a distance less than 3 m, it is necessary to move the fifth lens unit L5 to the object side as shown by the cam locus 1b. In this case also, the closer the fifth lens unit L5 gets to the telephoto end, the larger the required moving amount thereof becomes. Even when the first lens unit L1 is focused on a subject at a distance other than the above-described distances in the manual focus mode, and is fixed, a smooth focusing operation (i.e., smooth switching between the manual focus mode and the auto focus mode) can be achieved by switching the cam locus to an appropriate cam locus as occasion requires, and performing a movement control of the fifth lens unit L5 during zooming, as in the above-described case where the focusing on an object at an infinite distance or at a distance of 3 m is performed.

In the auto focus mode, wherever the fifth lens unit L5 is positioned on the optical axis, when the auto focus mode has been switched to the manual focus mode, the fifth lens unit L5 is moved back to a reference position on the optical axis by using a signal from the reference position sensor 6. This enables the focusing operation by the first lens unit to be performed quite normally. In this embodiment, the "reference position" is set to the position of the fifth lens unit L5 when each of the first lens unit L1 and the fifth lens unit L5 is focusing on an object at an infinite distance.

In this first embodiment, since the fifth lens unit L5 has several kinds of cam loci to be selected, the fifth lens unit L5 is preferably moved by a stepping motor or a DC motor with a position detecting function. On the other hand, since neither of the second and third lens units L2 and L3 change in the moving locus thereof, they may be caused to perform a zooming operation by a mechanical cam ring. However, the second and third lens units L2 and L3 are also allowed to be caused to perform a zooming operation by actuating means such as a stepping motor.

Second Embodiment

Figure 8A:
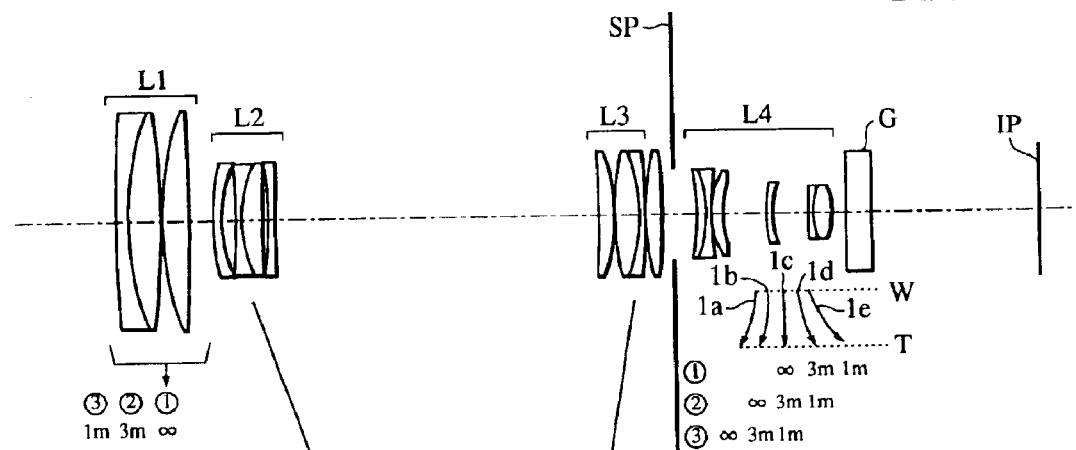
FIGS. 8A to 8C show sections of zoom lenses according to a second embodiment of the present invention, in which a description of a cam table of a rear focusing unit is included.
Figure 8B:
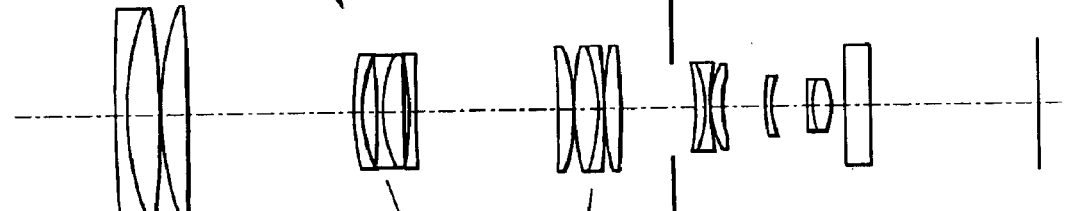
Figure 8C:
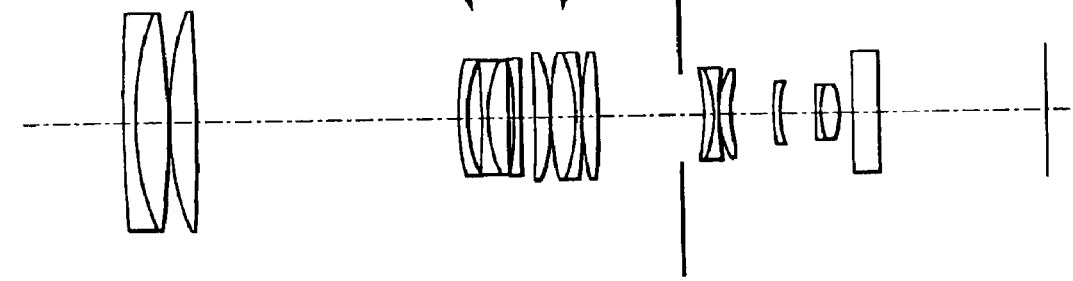
Figure 9:
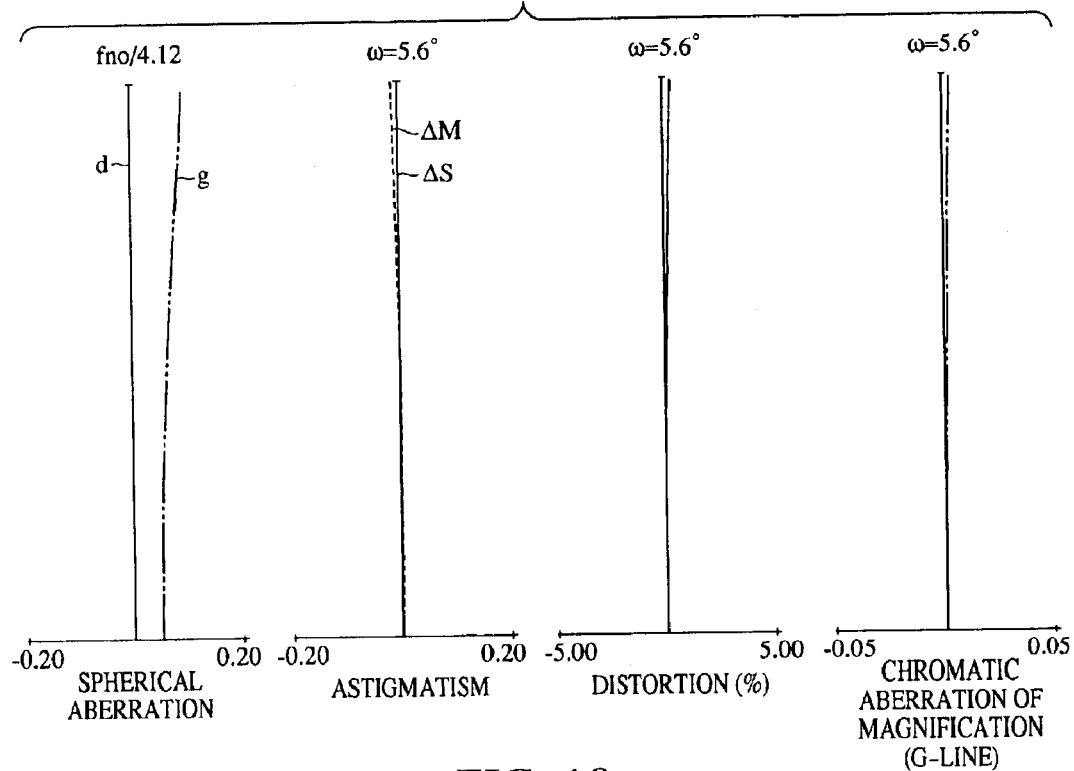
FIG. 9 shows aberrations at the wide angle end when focusing (object distance: 3 m) was performed by the first lens unit in the zoom lenses according to the second embodiment.
Figure 10:
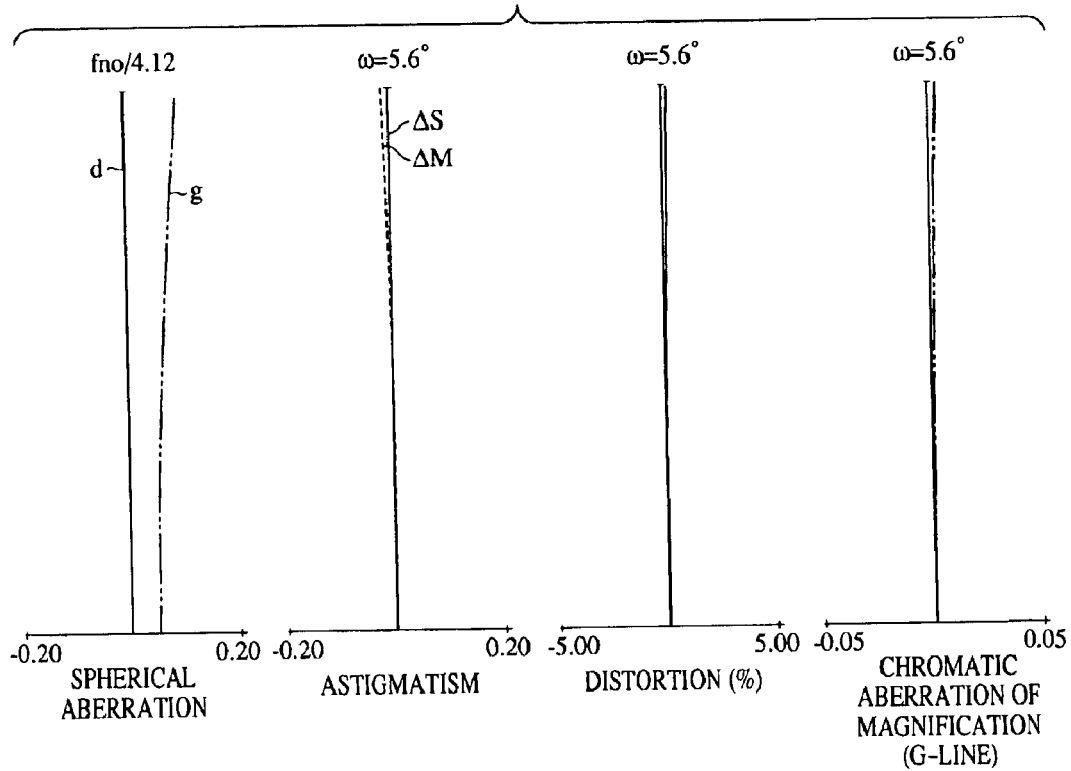
FIG. 10 shows aberrations at the wide angle end when focusing (object distance: 3 m) was performed by a fourth lens unit in the zoom lenses according to the second embodiment.
Figure 11:
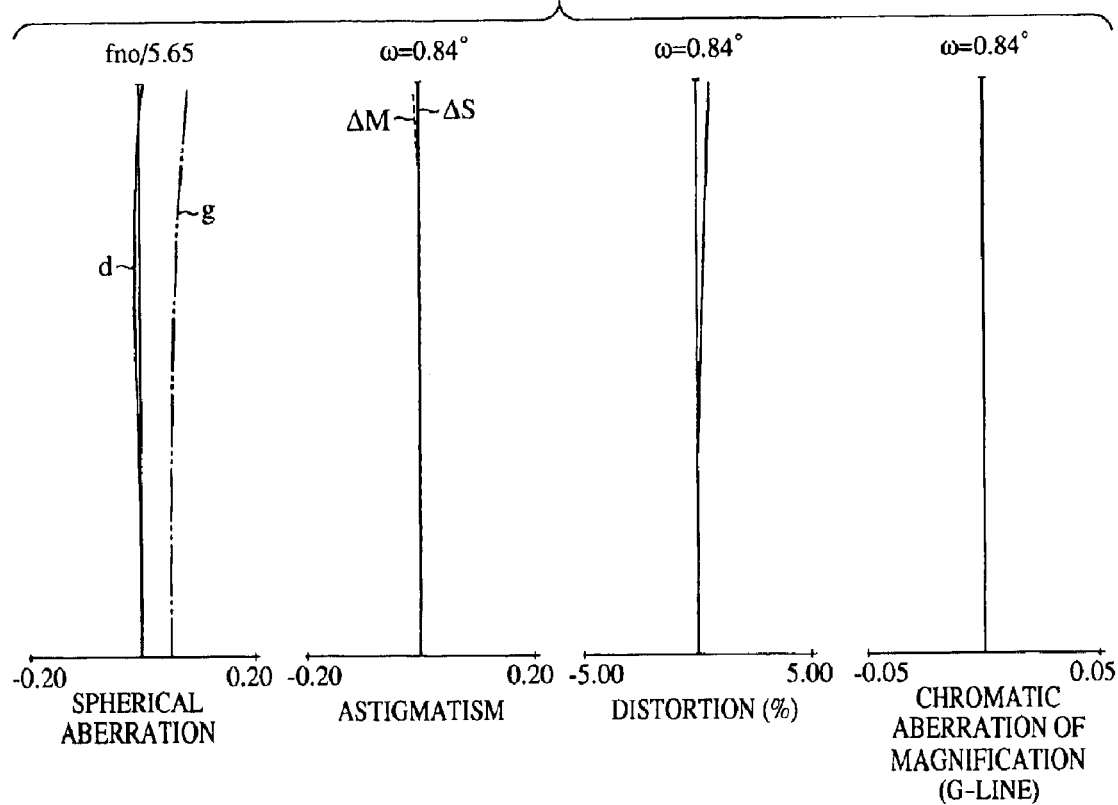
FIG. 11 shows aberrations at the telephoto end when focusing (object distance: 3 m) was performed by the first lens unit in the zoom lenses according to the second embodiment.
Figure 12:
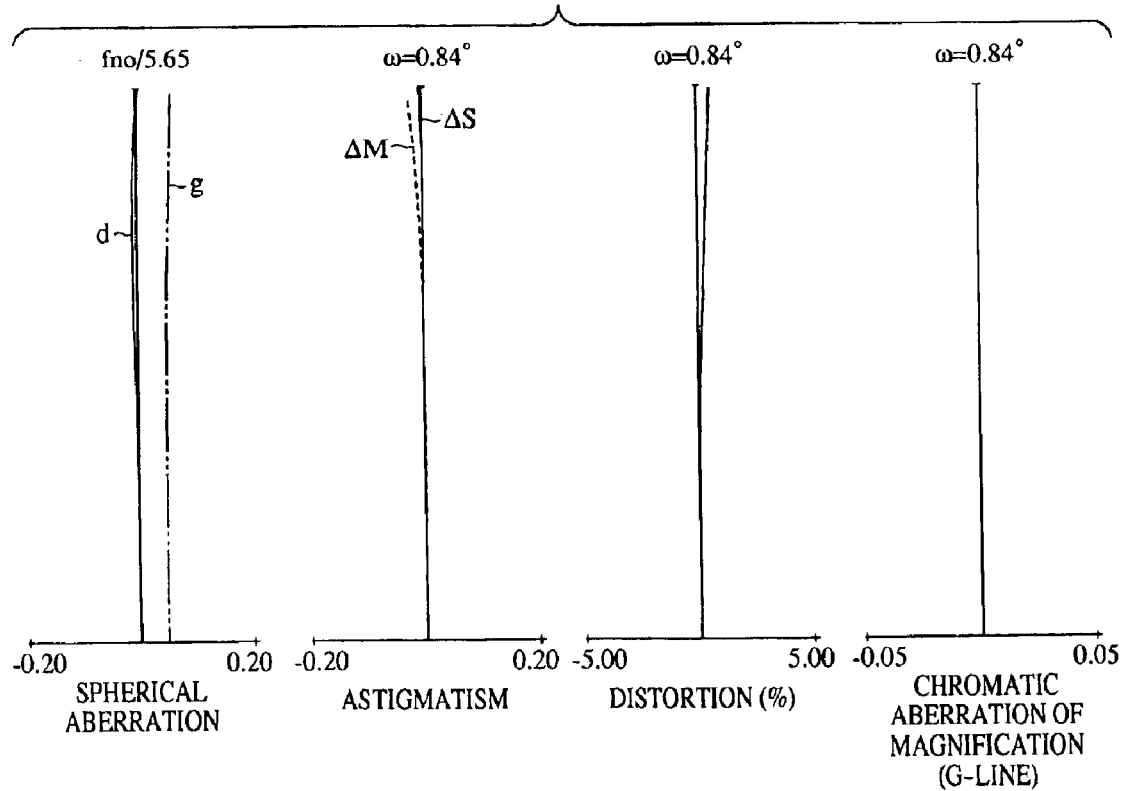
FIG. 12 shows aberrations at the telephoto end when focusing (object distance: 3 m) was performed by the fourth lens unit in the zoom lenses according to the second embodiment.

The second embodiment shown in FIGS. 8A to 8C includes, in order from the object side, a first lens unit with a positive refractive power, a second lens unit with a negative refractive power, a third lens unit with a positive refractive power, a fourth lens unit L4 with a negative refractive power. The first lens unit L1 has a structure capable of moving for focusing. The second lens unit L2 and the third lens unit L3 move along the optical axis for a variable power operation and for compensating for fluctuations of an image surface caused by the variable power operation, respectively. The fourth lens unit L4 has an image forming function, and has a structure capable of moving along the optical axis for focusing. Furthermore, the first lens unit L1 is provided with the position detecting sensor 4 described with reference to FIG. 1. The position detecting sensor 4 notifies the microcomputer 8 of the "subject distance" position on which the first lens unit L1 is focusing.

In the manual focusing mode, the first lens unit L1 is moved. The first lens unit L1 is positioned in front of the second lens unit L2 as a variable power lens unit, and therefore, given the same subject distance, the position of the first lens unit L1 on the optical axis is the same wherever the zoom position may be.

On the other hand, in the auto focus mode, the focusing operation is performed by moving the fourth lens unit L4 based on information from the focus detecting device. When zooming is to be performed, an appropriate moving locus is selected from the cam table 9 based on the position information about the first lens unit L1, as in the case of FIG. 1.

In FIG. 8A, ①, ②, and ③ represent the positions of the first lens unit L1 when it is focusing on three subjects at different distances: an infinite distance, an object distance of 3 m, and an object distance of 1 m, respectively. In this embodiment, five cam loci 1a to 1e are prepared as the cam table 9 for the fourth lens unit L4. Here, 1c to 1e denote the cam loci corresponding to the position ①, 1b to 1d denote those corresponding to the position ②, and 1a to 1c denote those corresponding to the position ③. Specifically, in the case where the first lens unit L1 is focused on an object at an infinite distance in the manual focus mode and is fixed, and where the manual mode is then switched to the auto focus mode, the information ① is transferred to the microcomputer 8 by the position detecting sensor 4, and during zooming, the fourth lens unit L4 is moved by using some of the cam loci 1c to 1e corresponding to the position ①, as control information.

In this situation, therefore, the fourth lens unit L4 constitutes the cam locus 1c with respect to an object at an infinite distance, and does not move along the optical axis during zooming. However, as the subject comes closer in a manner such as to be at an object distance of 3 m and further 1 m, the fourth lens unit L4 is retracted (i.e., moved toward the image side), thereby increasing the moving amount during zooming as shown by the cam loci 1d and 1e. Depending on the zoom position, the moving amount (retracting amount) of the fourth lens unit L4 during focusing varies, and it becomes the largest at the telephoto end.

In the case where the first lens unit L1 is focused on an object at a distance of 3 m in the manual focus mode and is fixed, and where the manual mode is then switched to the auto focus mode, some of the cam loci 1b to 1d corresponding to the position information ②  is selected. When the object distance is left at 3 m, the cam locus becomes 1c, so that it is not necessary to move the fourth lens unit L4 during zooming. However, when focusing is attempted with the fourth lens unit L4, and the fourth lens unit L4 is focused on a subject at a distance other than 3 m, for example, at an infinite distance, it is necessary to move the fourth lens unit L4 to the object side with the cam locus 1b. Herein, the closer the fourth lens unit L4 gets to the telephoto end, the larger the required moving amount thereof becomes. Conversely, when focusing is attempted with the fourth lens unit L4, and the fourth lens unit L4 is focused on a subject at a distance less than 3 m, it is necessary to move the fourth lens unit L4 to the image side as shown by the cam locus 1b. In this case also, the closer the fourth lens unit L4 gets to the telephoto end, the larger the required moving amount thereof becomes.

Even when the first lens unit L1 is focused on a subject at a distance other than the above-described distances in the manual focus mode, and is fixed, a smooth focusing operation can be achieved by switching the cam locus to an appropriate cam locus as occasion requires, and performing a movement control of the fourth lens unit L4 during zooming, as in the above-described case where the focusing on an object at an infinite distance or at a distance of 3 m is performed.

In the auto focus mode, wherever the fourth lens unit L4 is positioned on the optical axis, when the auto focus mode is switched to the manual focus mode, the fourth lens unit L4 is moved back to a reference position on the optical axis by using a signal from the reference position sensor 6. This enables the focusing operation by the first lens unit to be performed quite normally. In this embodiment, the "reference position" is set to the position of the fourth lens unit L4 when each of the first lens unit L1 and the fourth lens unit L4 is focusing on an object at an infinite distance.

In this second embodiment, since the fourth lens unit L4 has several kinds of cam loci to be selected, the fourth lens unit L4 is preferably moved by a stepping motor or a DC motor with a position detecting function. On the other hand, since neither of the second and third lens units L2 and L3 change in the moving locus thereof, they may be caused to perform a zooming operation by a mechanical cam ring. However, the second and third lens units L2 and L3 are also allowed to be caused to perform a zooming operation by actuating means such as a stepping motor.

Third Embodiment

Figure 13A:
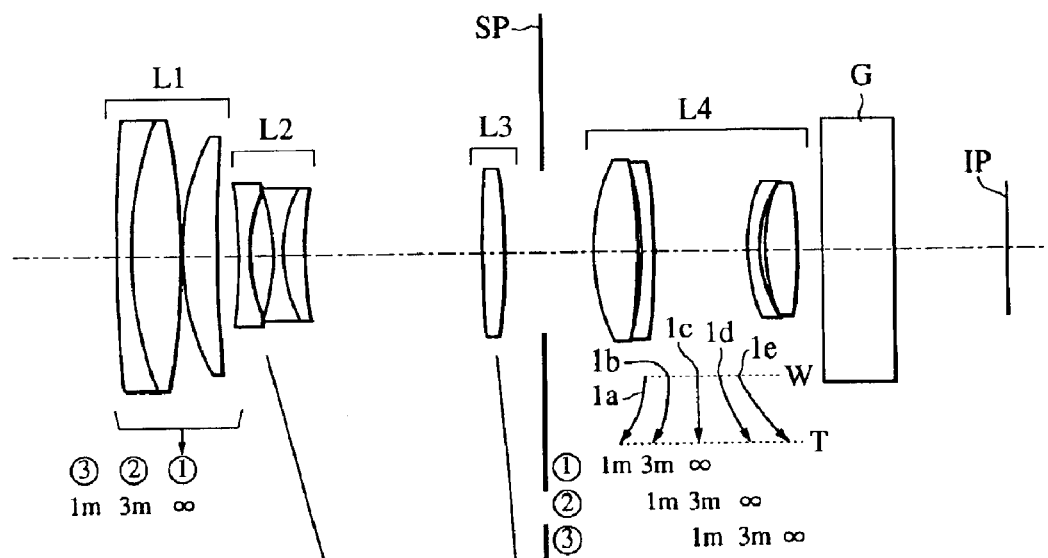
FIGS. 13A to 13C show sections of zoom lenses according to a third embodiment of the present invention, in which a description of a cam table of a rear focusing unit.
Figure 13B:
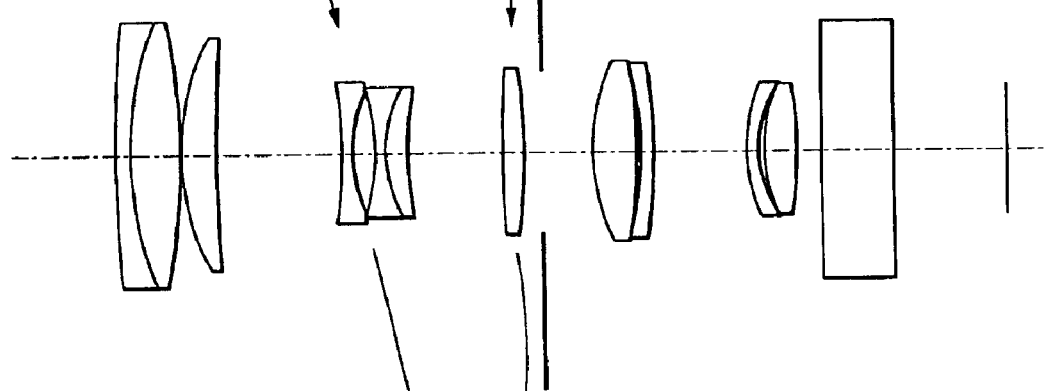
Figure 13C:
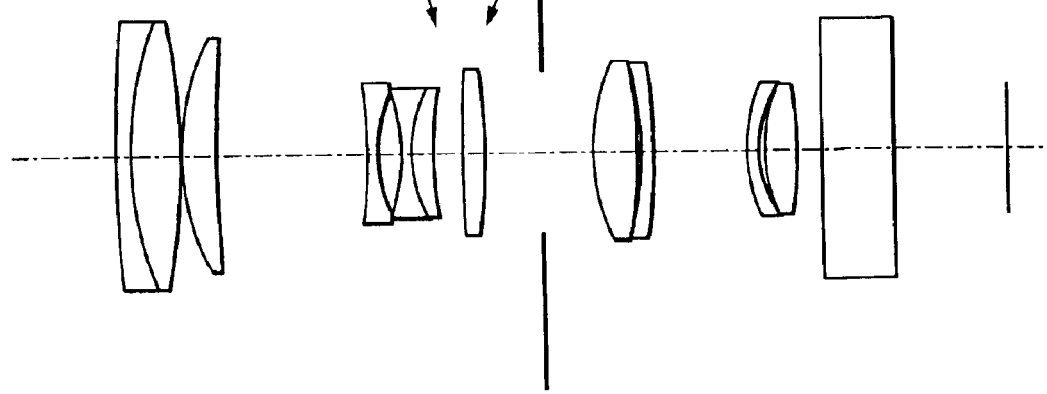
Figure 14:
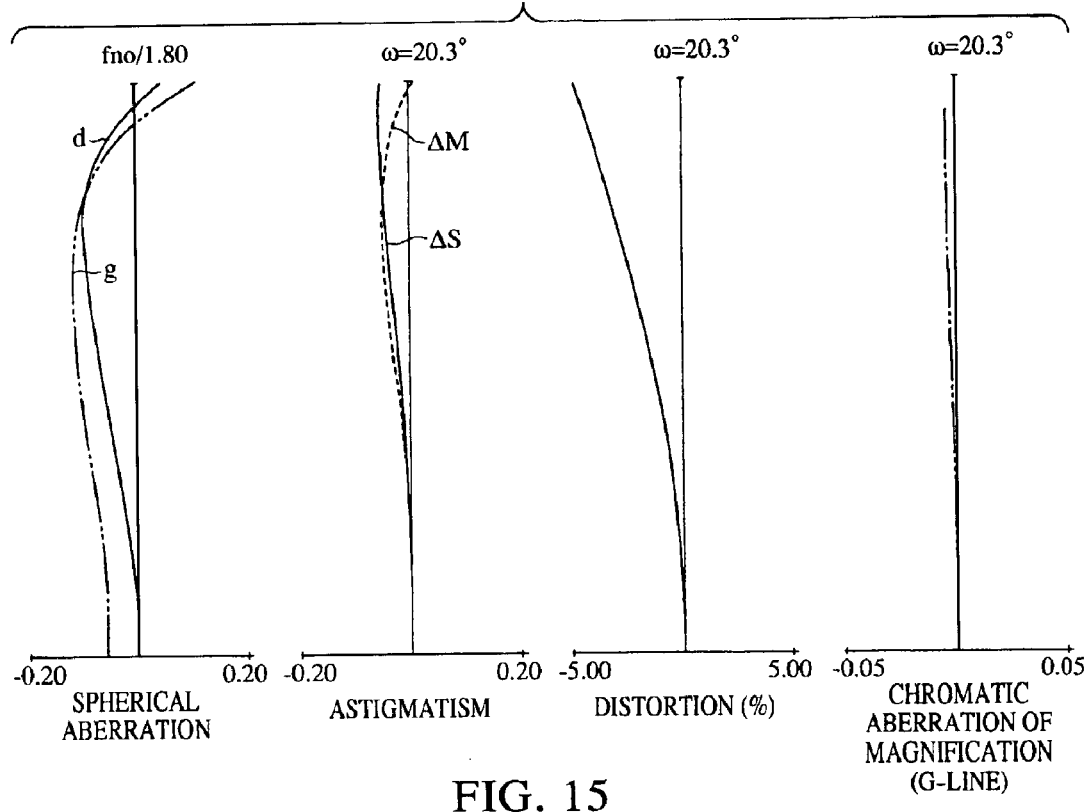
FIG. 14 shows aberrations at the wide angle end when focusing (object distance: 3 m) was performed by the first lens unit in the zoom lenses according to the third embodiment.
Figure 15:
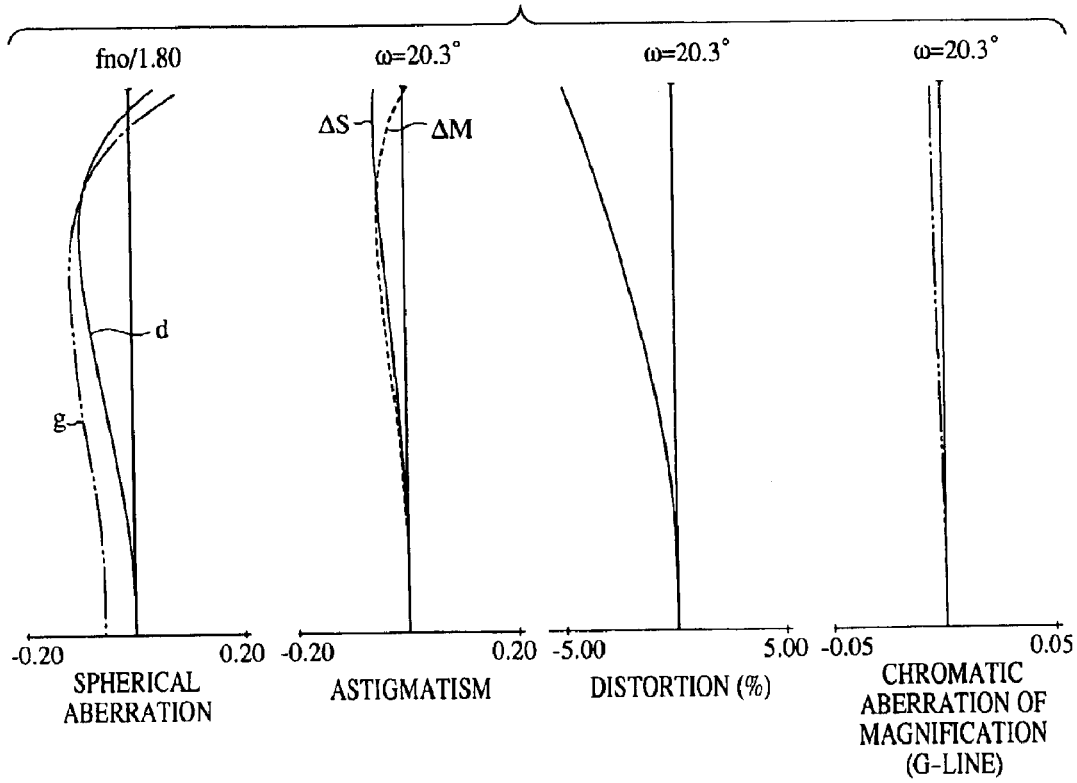
FIG. 15 shows aberrations at the wide angle end when focusing (object distance: 3 m) was performed by the fourth lens unit in the zoom lenses according to the third embodiment.
Figure 16:
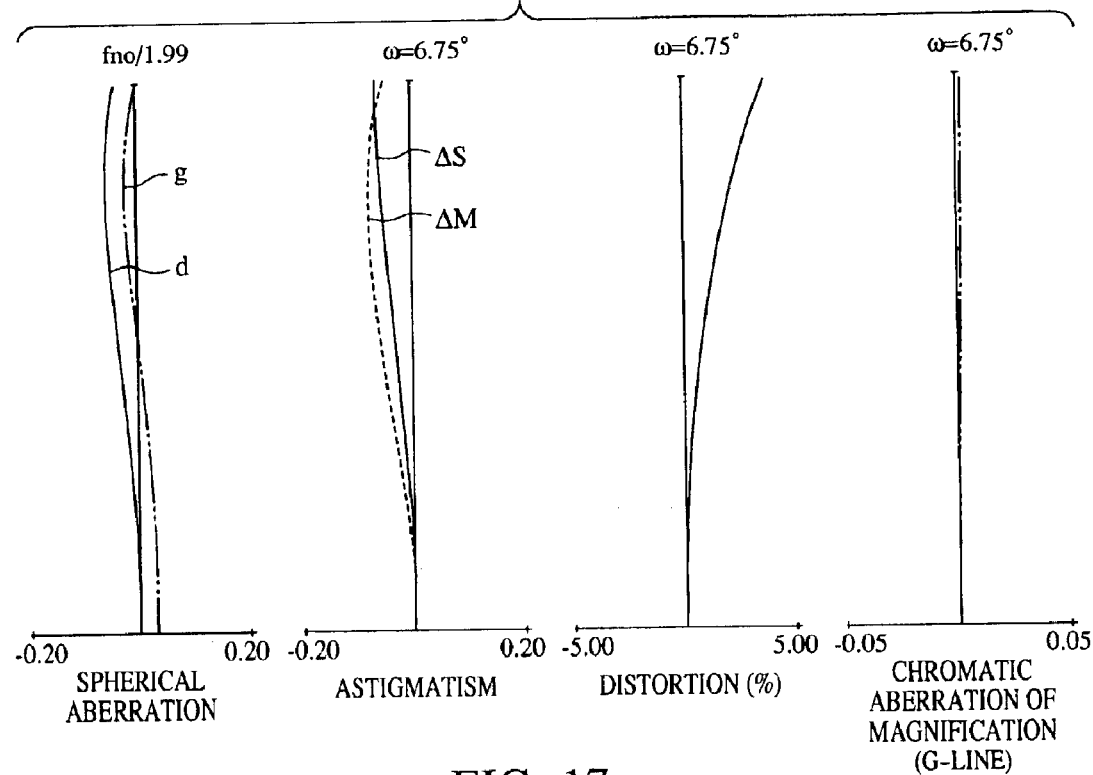
FIG. 16 shows aberrations at the telephoto end when focusing (object distance: 3 m) was performed by the first lens unit in the zoom lenses according to the third embodiment.
Figure 17:
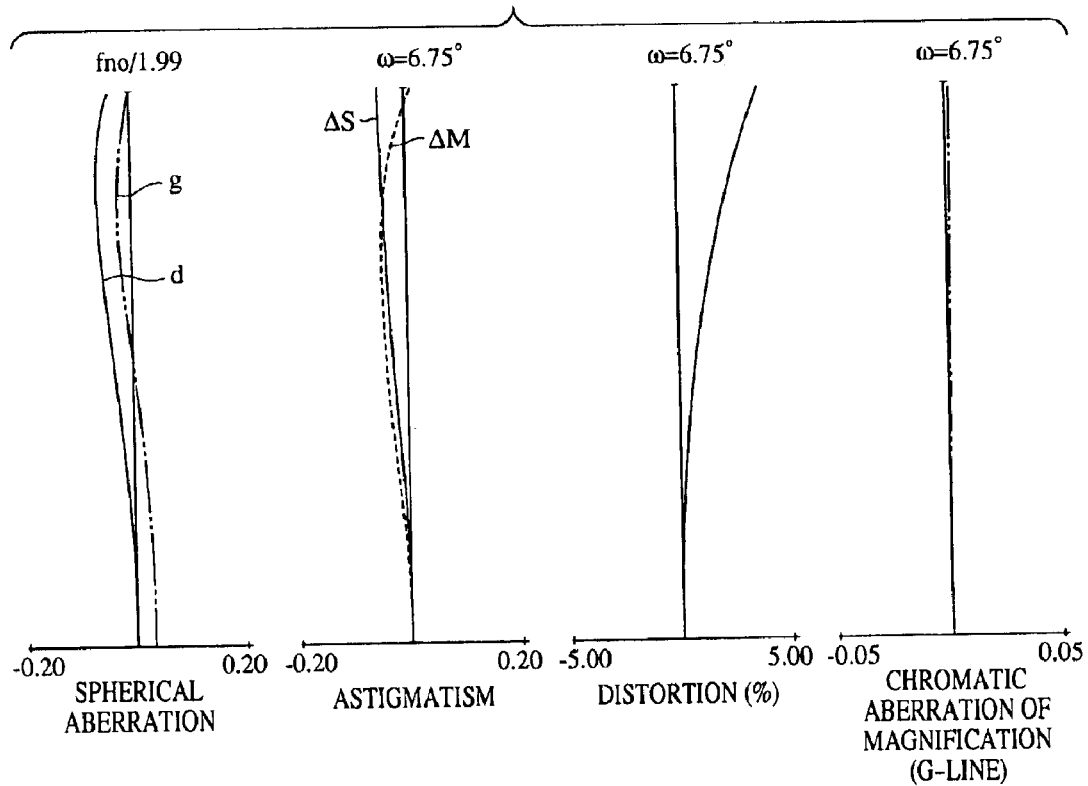
FIG. 17 shows aberrations at the telephoto end when focusing (object distance: 3 m) was performed by the fourth group, in the zoom lenses according to the third embodiment.

The third embodiment shown in FIGS. 13A to 13C includes, in order from the object side, a first lens unit with a positive refractive power, a second lens unit with a negative refractive power, and third and fourth lens units each having a positive refractive power. The first lens unit L1 has a structure capable of moving for focusing. The second lens unit L2 and the third lens unit L3 move along the optical axis for a variable power operation and for compensating for fluctuations of an image surface caused by the variable power operation, respectively. The fourth lens unit L4 has an image forming function, and has a structure capable of moving along the optical axis for focusing. Furthermore, the first lens unit L1 is provided with the position detecting sensor 4 described with reference to FIG. 1. The position detecting sensor 4 notifies the microcomputer 8 of the "subject distance" position on which the first lens unit L1 is focusing.

In the manual focusing mode, focusing is performed by moving the first lens unit L1. The first lens unit L1 is positioned in front of the second lens unit L2 as a variable power lens unit, and therefore, given the same subject distance, the position of the first lens unit L1 on the optical axis is the same wherever the zoom position may be.

On the other hand, in the auto focus mode, focusing is performed by moving the fourth lens unit L4 based on information from the focus detecting device, as in the case of the second embodiment shown in FIG. 8. When zooming is to be performed in the auto focus mode, an appropriate moving locus is selected from the cam table 9 based on the position information about the first lens unit L1.

In FIG. 13A, ①, ②, and ③ represent the positions of the first lens unit L1 when it is focusing on three subjects at different distances: an infinite distance, an object distance of 3 m, and an object distance of 1 m, respectively. In this third embodiment, five cam loci 1a to 1e are prepared as the cam table 9 for the fourth lens unit L4. Here, 1a to 1c denote the cam loci corresponding to the position ①, 1b to 1d denote those corresponding to the position ②, and 1c to 1e denote those corresponding to the position ③.

Specifically, in the case where the first lens unit L1 is focused on an object at an infinite distance in the manual focus mode and is fixed, and where the manual mode is then switched to the auto focus mode, the information ① is transferred to the microcomputer 8 by the position detecting sensor 4, and during zooming, the fourth lens unit L4 is moved by using some of the cam loci 1a to 1c corresponding to the position ①, as control information. In this situation, therefore, the fourth lens unit L4 constitutes the cam locus 1c with respect to an object at an infinite distance, and does not move along the optical axis during zooming. However, as the subject comes closer in a manner such as to be at an object distance of 3 m and further 1 m, the fourth lens unit L4 is extended (i.e., moved toward the object side), thereby increasing the moving amount during zooming as shown by the cam loci 1b and 1a.

Depending on the zoom position, the moving amount (extending amount) of the fourth lens unit L4 during focusing varies, and it becomes the largest at the telephoto end. In the case where the first lens unit L1 is focused on an object at a distance of 3 m in the manual focus mode and is fixed, and where the manual mode is then switched to the auto focus mode, some of the cam loci 1b to 1d corresponding to the position information ②is selected. When the object distance is left at 3 m, the cam locus becomes 1c, so that it is not necessary to move the fourth lens unit L4 during zooming. However, when focusing is attempted with the fourth lens unit L4, and the fourth lens unit L4 is focused on a subject at a distance other than 3 m, for example, at an infinite distance, the cam locus becomes 1d, so that it is necessary to move the fourth lens unit L4 to the image side. Herein, the closer the fourth lens unit L4 gets to the telephoto end, the larger the required moving amount thereof becomes. Conversely, when focusing is attempted with the fourth lens unit L4, and the fourth lens unit L4 is focused on a subject at a distance less than 3 m, it is necessary to move the fourth lens unit L4 to the object side as shown by the cam locus 1b. In this case also, the closer the fourth lens unit L4 gets to the telephoto end, the larger the required moving amount thereof becomes. Even when the first lens unit L1 is focused on a subject at a distance other than the above-described distances in the manual focus mode, and is fixed, a smooth focusing operation can be achieved by switching the cam locus to an appropriate cam locus as occasion requires, and performing a movement control of the fourth lens unit L4 during zooming, as in the above-described case where the focusing on an object at an infinite distance or at a distance of 3 m is performed.

In the auto focus mode, wherever the fourth lens unit L4 is positioned on the optical axis, when the auto focus mode is switched to the manual focus mode, the fourth lens unit L4 is moved back to a reference position on the optical axis by using a signal from the reference position sensor 6. This enables the focusing operation by the first lens unit to be performed quite normally. In this embodiment, the "reference position" is set to the position of the fourth lens unit L4 when each of the first lens unit L1 and the fourth lens unit L4 is focusing on an object at an infinite distance.

In this embodiment, since the fourth lens unit L4 has several kinds of cam loci to be selected, the fourth lens unit L4 is preferably moved by a stepping motor or a DC motor with a position detecting function. On the other hand, since neither of the second and third lens units L2 and L3 change in the moving locus thereof, they may be caused to perform a zooming operation by a mechanical cam ring. However, the second and third lens units L2 and L3 are also allowed to be caused to perform a zooming operation by actuating means such as a stepping motor.

Fourth Embodiment

Figure 18A:
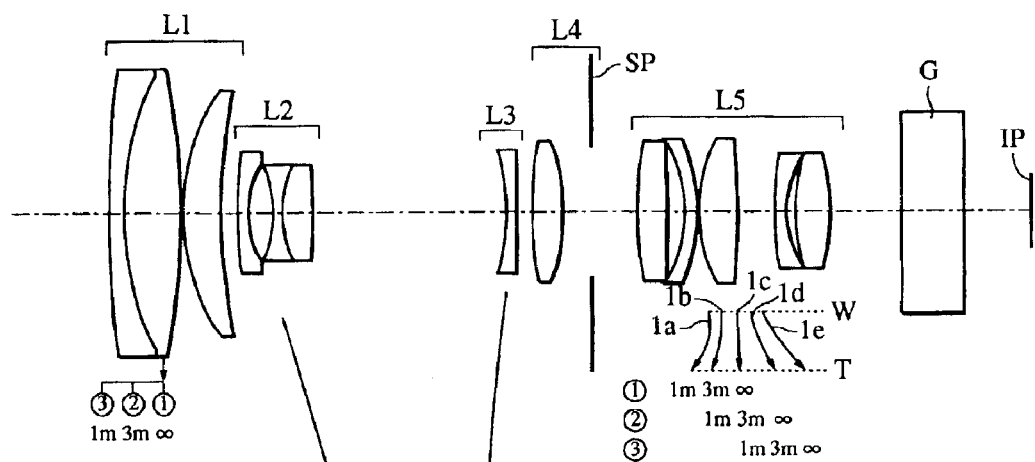
FIGS. 18A to 18C show sections of zoom lenses according to a fourth embodiment of the present invention, in which a description of a cam table of a rear focusing unit.
Figure 18B:
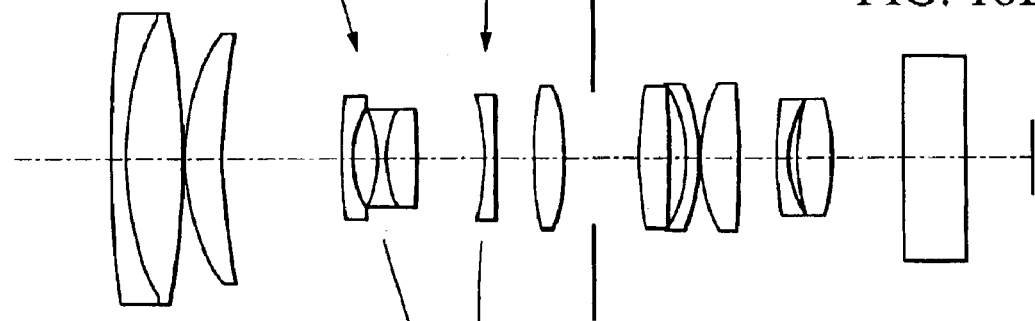
Figure 18C:
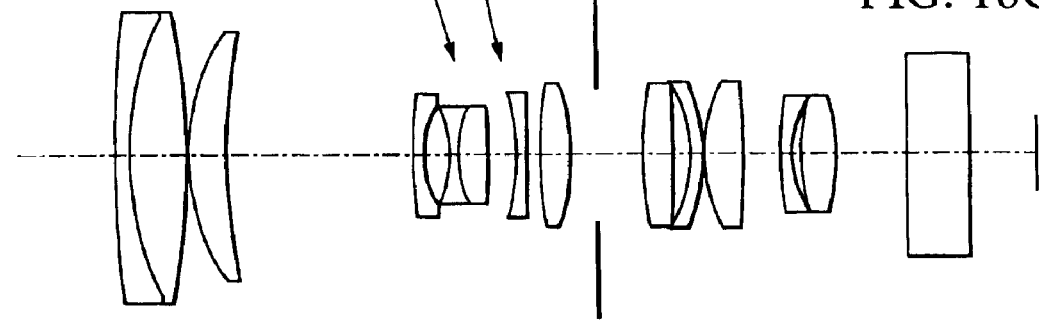
Figure 19:
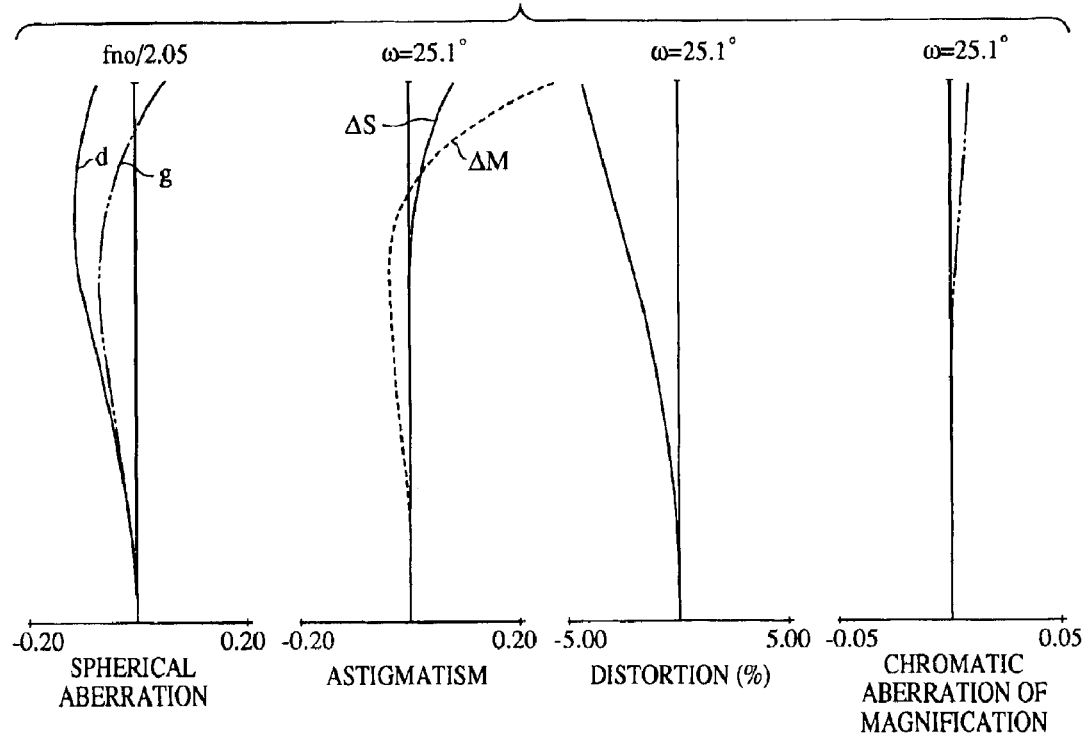
FIG. 19 shows aberrations at the wide angle end when focusing (object distance: 3 m) was performed by the first lens unit, in the zoom lenses according to the fourth embodiment.
Figure 20:
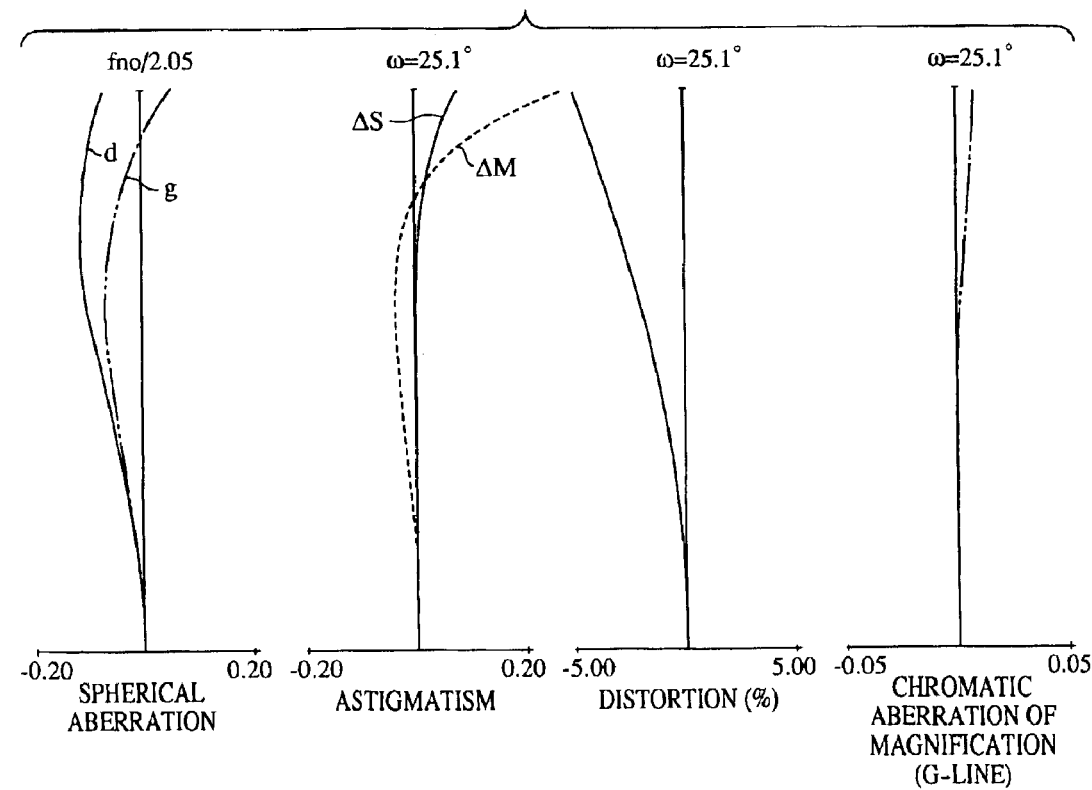
FIG. 20 shows aberrations at the wide angle end when focusing (object distance: 3 m) was performed by the fifth lens unit in the zoom lenses according to the fourth embodiment.
Figure 21:
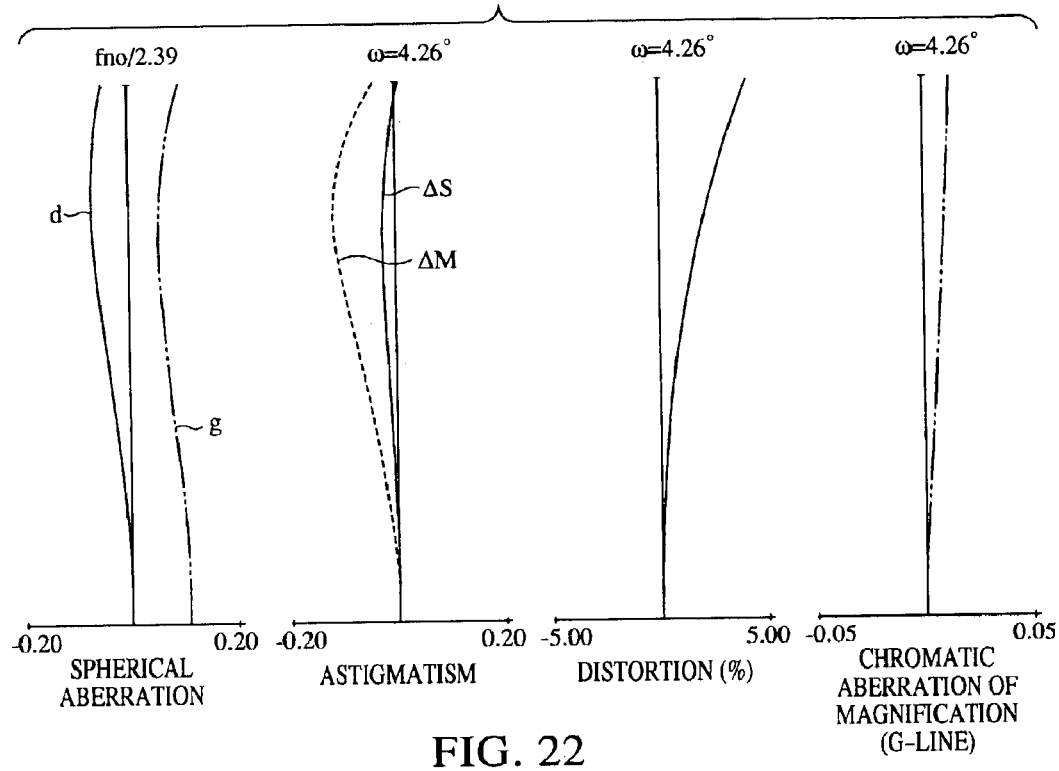
FIG. 21 shows aberrations at the telephoto end when focusing (object distance: 3 m) was performed by the first lens unit in the zoom lenses according to the fourth embodiment.
Figure 22:
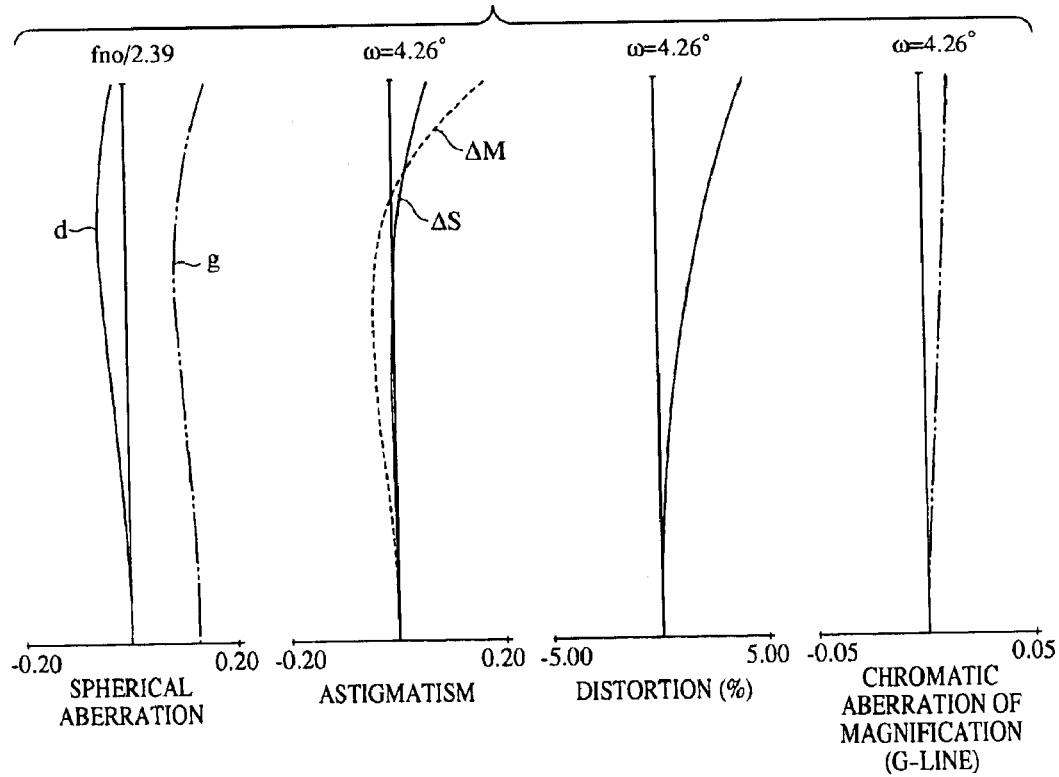
FIG. 22 shows aberrations at the telephoto end when focusing (object distance: 3 m) was performed by the fifth lens unit, in the zoom lenses according to the fourth embodiment.

The fourth embodiment shown in FIGS. 18A to 18C includes, in order from the object side, a first lens unit L1 with a positive refractive power, second and third lens units L2 and L3 each having a negative refractive power, and fourth and fifth lens units L4 and L5 each having a positive refractive power. The first lens unit L1 has a structure capable of moving for focusing. The second lens unit L2 and the third lens unit L3 move along the optical axis as indicated by the respective arrows in FIGS. 18A to 18C, for a variable power operation and for compensating for fluctuations of an image surface caused by the variable power operation, respectively. The fourth lens unit L4 causes divergent bundle of rays from the third lens unit L3 to be afocal. The fifth lens unit L5 has a function of forming an image on the image-pickup surface IP, and has a structure capable of moving along the optical axis for focusing.

Furthermore, the first lens unit L1 is provided with the position detecting sensor 4 described with reference to FIG. 1. The position detecting sensor 4 notifies the microcomputer 8 of the "subject distance" position on which the first lens unit L1 is focusing.

In the manual focusing mode, a focusing method is adopted in which the first lens unit L1 is moved. The first lens unit L1 is positioned in front of the second lens unit L2 as a variable power lens unit, and therefore, given the same subject distance, the position of the first lens unit L1 on the optical axis is the same wherever the zoom position may be. On the other hand, in the auto focus mode, focusing is performed by moving the fifth lens unit L5 as in the case of the first embodiment. When zooming is to be performed in the auto focus mode, an appropriate moving locus is selected from the cam table 9 based on the position information about the first lens unit L1 on the optical axis.

In FIG. 18A, ①, ②, and ③ represent the positions of the first lens unit L1 when it is focusing on three subjects at different distances: an infinite distance, an object distance of 3 m, and an object distance of 1 m, respectively. In this fourth embodiment, five cam loci 1a to 1e are prepared as the cam table 9 for the fifth lens unit L5. Here, 1a to 1c denote the cam loci corresponding to the position ①, 1b to 1d denote those corresponding to the position ②, and 1c to 1e denote those corresponding to the position ③. Specifically, in the case where the first lens unit L1 is focused on an object at an infinite distance in the manual focus mode and is fixed, and where the manual mode is then switched to the auto focus mode, the information ① is transferred to the microcomputer 8 by the position detecting sensor 4, and during zooming, the fifth lens unit L5 is moved by using some of the cam loci 1a to 1c corresponding to the position ①, as control information.

In this situation, therefore, the fifth lens unit L5 constitutes the cam locus 1c with respect to an object at an infinite distance, and does not move along the optical axis during zooming. However, as the subject comes closer in a manner such as to be at an object distance of 3 m and further 1 m, the fifth lens unit L5 is extended (i.e., moved toward the object side), thereby increasing the moving amount during zooming as shown by the cam loci 1b and 1a.

Depending on the zoom position, the moving amount (extending amount) of the fifth lens unit L5 during focusing varies, and becomes the largest at the telephoto end.

In the case where the first lens unit L1 is focused on an object at a distance of 3 m in the manual focus mode and is fixed, and where the manual mode is then switched to the auto focus mode, some of the cam loci 1b to 1d corresponding to the position ② is selected. When the object distance is left at 3 m, the cam locus becomes 1c, so that the fifth lens unit L5 does not move during zooming. However, when focusing is attempted with the fifth lens unit L5, and the fifth lens unit L5 is focused on a subject at a distance other than 3 m, for example, at an infinite distance, the cam locus becomes 1b, so that it is necessary to move the fifth lens unit L5 to the image side. Herein, the closer the fifth lens unit L5 gets to the telephoto end, the larger the required moving amount thereof becomes.

Conversely, when focusing is attempted with the fifth lens unit L5, and the fifth lens unit L5 is focused on a subject at a distance less than 3 m, it is necessary to move the fifth lens unit L5 to the object side as shown by the cam locus 1b. In this case also, the closer the fifth lens unit L5 gets to the telephoto end, the larger the required moving amount thereof becomes.

Even when the first lens unit L1 is focused on a subject at a distance other than the above-described distances in the manual focus mode, and is fixed, a smooth focusing operation can be achieved by switching the cam locus to an appropriate cam locus as occasion requires, and performing a movement control of the fifth lens unit L5 during zooming, as in the above-described case where the focusing on an object at an infinite distance or at a distance of 3 m is performed.

In the auto focus mode, wherever the fifth lens unit L5 is positioned on the optical axis, when the auto focus mode is switched to the manual focus mode, the fifth lens unit L5 is moved back to a reference position on the optical axis by using a signal from the reference position sensor 6. This enables the focusing operation by the first lens unit to performed quite normally. In this embodiment, the "reference position" is set to the position of the fifth lens unit L5 when each of the first lens unit L1 and the fifth lens unit L5 is focusing on an object at an infinite distance.

In this embodiment, since the fifth lens unit L5 has several kinds of cam loci to be selected, the fifth lens unit L5 is preferably moved by a stepping motor or a DC motor with a position detecting function. On the other hand, since neither of the second and third lens units L2 and L3 change in the moving locus thereof, they may be caused to perform a zooming operation by a mechanical cam ring. However, the second and third lens units L2 and L3 are also allowed to be caused to perform a zooming operation by actuating means such as a stepping motor.

Now, in the above-described embodiments, where the focal length of the overall system at an arbitrary zoom position is represented by fL, and the resultant focal length of systems from a foremost lens unit (the first lens unit L1) to the lens unit immediately in front of the rear focusing lens unit (i.e., the fourth lens unit L4 for the case of the first and fourth embodiments, and the third lens unit L3 for the case of the second and third embodiments) at the same zoom position is represented by fAL, it is preferable that the following conditional expression: −3<fL/fAL<4 be satisfied at all zoom positions.

The above expression represents the degree of convergence of light rays made incident on the rear focusing lens unit. Exceeding either of the upper limit value or the lower limit value of fL/fAL frequently undesirably causes variations in the aberrations due to focusing in the auto focus mode.

Letting fL/fAL=KL, and letting the KL value at the wide angle end and that at the telephoto end be KW and KT, respectively, it is preferable that the following conditional expression: 0.9<KW/KT<1.1 is satisfied. It is more preferable that KW/KT=1.0.

The aforementioned conditional expression defines error amount due to the zoom position when the rear focusing lens unit (the fifth lens unit L5 for the case of the first and fourth embodiments, and the fourth lens unit L4 for the case of the second and third embodiments) is moved back to the reference position in the manual focus mode. In this case also, if either of the upper limit value or the lower limit value is exceeded, variations in focus due to zooming in the manual focus mode become unignorable.

Meanwhile, in the embodiments of the present invention, it is also possible to correct displacement in the direction perpendicular to the optical direction due to camera shake or the like, by moving any lens unit or one portion thereof in the direction perpendicular to the optical direction.

Next, numerical examples 1 to 4 corresponding to the first to fourth embodiments are shown below. In each of the numerical examples, i denotes the order of optical surfaces viewed from the object side, Ri denotes the curvature radius of an i-th optical surface (i.e., an i-th surface), Di denotes the distance between the i-th surface and an (i+1)th surface, and Ni and νi denote the refractive index and the Abbe number of the material of an i-th optical member with respect to the d-line, respectively. f denotes a focal length, Fno denotes F-number, and ω denotes a half angle of view.

R24 to R26 in the numerical example 1, R31 and R32 in the numerical example 2, R22 and R23 in the numerical example 3, and R26 and R27 in the numerical example 4 are optical members G. These are provided for design in correspondence with, e.g., an infrared cut glass, an optical low-pass filter, a protective glass for a solid state image pickup device, or the like.

Here, when k represents an eccentricity, B, C, D, E, F . . . represent aspheric coefficients, and the displacement in the optical axis direction, at a height h from the optical axis is represented by x relative to the surface apex, the aspheric shape is expressed by the following equation.

$$x = \frac{h^2/R}{1+\{1-(1+K)(h/R)^2\}^{1/2}} + Bh^4 + Ch^6 + Dh^8 + Eh^{10} + Fh^{12}\ldots$$

Here, R denotes a curvature radius.

In the calculations of aspheric coefficients, for example, the expression: "e−Z" means "$10^{-z}$". Table 1 shows correspondence between each the above-described conditional expressions and one of the numerical examples.

Numerical Example 1 f = 10 to 162.0   Fno = 1.65 to 2.70   2ω = 58.4° to 3.8°

| | | |
|---|---|---|
| R 1 = 142.764 | D 1 = 3.01 | N 1 = 1.84666   ν 1 = 23.8 |
| R 2 = 73.121 | D 2 = 10.09 | N 2 = 1.60311   ν 2 = 60.6 |
| R 3 = −786.331 | D 3 = 0.35 | |
| R 4 = 65.974 | D 4 = 5.84 | N 3 = 1.69680   ν 3 = 55.5 |
| R 5 = 172.467 | D 5 = Variable | |
| R 6 = 81.262 | D 6 = 1.59 | N 4 = 1.88300   ν 4 = 40.8 |
| R 7 = 15.533 | D 7 = 6.42 | |
| R 8 = −59.753 | D 8 = 1.42 | N 5 = 1.88300   ν 5 = 40.8 |
| R 9 = 102.816 | D 9 = 1.06 | |
| R10 = 30.879 | D10 = 5.49 | N 6 = 1.84666   ν 6 = 23.8 |
| R11 = −61.177 | D11 = 0.53 | |
| R12 = −41.526 | D12 = 1.42 | N 7 = 1.77250   ν 7 = 49.6 |
| R13 = 108.381 | D13 = Variable | |
| R14 = Stop | D14 = 6.81 | |
| R15 = −35.391 | D15 = 1.77 | N 8 = 1.77250   ν 8 = 49.6 |
| R16 = −142.950 | D16 = Variable | |
| R17 = −119.917(*) | D17 = 8.15 | N 9 = 1.58313   ν 9 = 59.4 |
| R18 = −36.144 | D18 = 40.498 | |
| R19 = 50.576(*) | D19 = 6.55 | N10 = 1.58313   ν10 = 59.4 |
| R20 = −319.306 | D20 = 3.01 | |
| R21 = 108.714 | D21 = 1.77 | N11 = 1.84666   ν11 = 23.8 |
| R22 = 38.554 | D22 = 8.08 | N12 = 1.48749   ν12 = 70.2 |
| R23 = −58.779 | D23 = 15.69 | |
| R24 = ∞ | D24 = 9.48 | N13 = 1.51633   ν13 = 64.1 |
| R25 = ∞ | D25 = 35.42 | N14 = 1.58913   ν14 = 61.2 |
| R26 = ∞ | | |

| Variable | Focal Length | | |
|---|---|---|---|
| Distance | 10.0 | 30.3 | 162.0 |
| D 5 | 1.651 | 41.905 | 68.741 |
| D13 | 70.505 | 23.203 | 3.838 |
| D16 | 3.450 | 10.499 | 3.028 |

Aspherical Coefficients(*)
R17 k = 2.10413e+01 B = −5.75084e−06
C = −9.34593e−10 D = −7.39135e−13
E = 0.0 F =0.0
R19 k = 5.52434e−01 B = −3.27200e−06
C = 3.62799e−10 D = −1.07675e−12
E = 0.0 F = 0.0

Numerical Example 2 f = 10 to 67.3   Fno = 4.12 to 5.65   2ω = 11.2° to 1.68°

| | | |
|---|---|---|
| R 1 = 139.946 | D 1 = 0.58 | N 1 = 1.83400   ν 1 = 37.2 |
| R 2 = 17.234 | D 2 = 1.96 | N 2 = 1.48749   ν 2 = 70.2 |
| R 3 = −54.817 | D 3 = 0.06 | |
| R 4 = 18.289 | D 4 = 1.59 | N 3 = 1.56384   ν 3 = 60.7 |
| R 5 = −114.586 | D 5 = Variable | |
| R 6 = 13.778 | D 6 = 0.47 | N 4 = 1.69680   ν 4 = 55.5 |
| R 7 = 7.939 | D 7 = 0.87 | |
| R 8 = −23.359 | D 8 = 0.33 | N 5 = 1.77250   ν 5 = 49.6 |
| R 9 = 7.399 | D 9 = 1.21 | N 6 = 1.84666   ν 6 = 23.8 |
| R10 = 102.648 | D10 = 0.38 | |
| R11 = −14.989 | D11 = 0.33 | N 7 = 1.69680   ν 7 = 55.5 |
| R12 = 75.113 | D12 = Variable | |
| R13 = −108.166 | D13 = 0.98 | N 8 = 1.56384   ν 8 = 60.7 |
| R14 = −11.047 | D14 = 0.04 | |
| R15 = 18.240 | D15 = 1.38 | N 9 = 1.49700   ν 9 = 81.6 |
| R16 = −10.623 | D16 = 0.35 | N10 = 1.84666   ν10 = 23.8 |
| R17 = −37.817 | D17 = 0.04 | |
| R18 = 13.450 | D18 = 0.98 | N11 = 1.48749   ν11 = 70.2 |
| R19 = −31.599 | D19 = Variable | |
| R20 = Stop | D20 = 1.40 | |
| R21 = −14.350 | D21 = 0.58 | N12 = 1.60342   ν12 = 38.0 |
| R22 = −7.046 | D22 = 0.26 | N13 = 1.60311   ν13 = 60.7 |
| R23 = 14.725 | D23 = 0.07 | |
| R24 = 5.482 | D24 = 0.65 | N14 = 1.60342   ν14 = 38.0 |
| R25 = 16.838 | D25 = 2.246 | |
| R26 = 20.889 | D26 = 0.23 | N15 = 1.69680   ν15 = 55.5 |
| R27 = 4.405 | D27 = 2.25 | |
| R28 = −32.082 | D28 = 0.23 | N16 = 1.65844   ν16 = 50.9 |
| R29 = 5.201 | D29 = 1.00 | N17 = 1.51633   ν17 = 64.2 |
| R30 = −5.204 | D30 = 0.93 | |

-continued

| | | | |
|---|---|---|---|
| R31 = ∞ | D31 = 1.40 | N18 = 1.51633 | ν18 = 64.2 |
| R32 = ∞ | | | |

| Variable | Focal Length | | |
|---|---|---|---|
| Distance | 10.0 | 27.6 | 67.3 |
| D 5 | 1.531 | 10.066 | 15.755 |
| D12 | 19.148 | 8.337 | 0.841 |
| D19 | 0.661 | 2.937 | 4.743 |

Numerical Example 3 f = 10 to 28.5  Fno = 1.80 to 1.99  2ω = 40.6° to 13.5°

| | | | |
|---|---|---|---|
| R 1 = 120.019 | D 1 = 0.89 | N 1 = 1.80518 | ν 1 = 25.4 |
| R 2 = 24.167 | D 2 = 3.09 | N 2 = 1.56384 | ν 2 = 60.7 |
| R 3 = −41.700 | D 3 = 0.12 | | |
| R 4 = 17.362 | D 4 = 2.19 | N 3 = 1.63854 | ν 3 = 55.4 |
| R 5 = 97.667 | D 5 = Variable | | |
| R 6 = −41.149 | D 6 = 0.65 | N 4 = 1.69680 | ν 4 = 55.5 |
| R 7 = 11.201 | D 7 = 1.44 | | |
| R 8 = −14.846 | D 8 = 0.65 | N 5 = 1.51633 | ν 5 = 64.1 |
| R 9 = 9.866 | D 9 = 1.38 | N 6 = 1.84666 | ν 6 = 23.8 |
| R10 = 22.204 | D10 = Variable | | |
| R11 = 117.853 | D11 = 1.30 | N 7 = 1.69680 | ν 7 = 55.5 |
| R12 = −36.397 | D12 = Variable | | |
| R13 = Stop | D13 = 3.25 | | |
| R14 = 13.602 | D14 = 2.76 | N 8 = 1.69680 | ν 8 = 55.5 |
| R15 = −29.827 | D15 = 0.33 | | |
| R16 = −18.346 | D16 = 0.65 | N 9 = 1.84666 | ν 9 = 23.8 |
| R17 = −50.054 | D17 = 5.93 | | |
| R18 = 12.236 | D18 = 0.65 | N10 = 1.84666 | ν10 = 23.8 |
| R19 = 7.928 | D19 = 0.44 | | |
| R20 = 12.351 | D20 = 1.87 | N11 = 1.60311 | ν11 = 60.7 |
| R21 = −38.124 | D21 = 1.63 | | |
| R22 = ∞ | D22 = 4.47 | N12 = 1.51633 | ν12 = 64.1 |
| R23 = ∞ | | | |

| Variable | Focal Length | | |
|---|---|---|---|
| Distance | 10.0 | 21.1 | 28.5 |
| D 5 | 1.308 | 7.890 | 9.556 |
| D10 | 11.252 | 6.001 | 1.774 |
| D12 | 2.397 | 1.067 | 3.628 |

Numerical Example 4 f = 10 to 57.0  Fno = 2.05 to 2.39  2ω = 50.2° to 8.52°

| | | | |
|---|---|---|---|
| R 1 = 127.854 | D 1 = 1.39 | N 1 = 1.80518 | ν 1 = 25.4 |
| R 2 = 33.988 | D 2 = 5.98 | N 2 = 1.62299 | ν 2 = 58.1 |
| R 3 = −83.245 | D 3 = 0.28 | | |
| R 4 = 24.444 | D 4 = 3.75 | N 3 = 1.69680 | ν 3 = 55.5 |
| R 5 = 65.020 | D 5 = Variable | | |
| R 6 = 57.297 | D 6 = 1.11 | N 4 = 1.77250 | ν 4 = 49.6 |
| R 7 = 10.506 | D 7 = 2.71 | | |
| R 8 = −13.013 | D 8 = 0.97 | N 5 = 1.77250 | ν 5 = 49.6 |
| R 9 = 13.024 | D 9 = 2.92 | N 6 = 1.80518 | ν 6 = 25.4 |
| R10 = −72.679 | D10 = Variable | | |
| R11 = −23.415 | D11 = 1.11 | N 7 = 1.69680 | ν 7 = 55.5 |
| R12 = −719.262 | D12 = Variable | | |
| R13 = 51.065 | D13 = 3.20 | N 8 = 1.69680 | ν 8 = 55.5 |
| R14 = −22.712 | D14 = 2.78 | | |
| R15 = Stop | D15 = 4.87 | | |
| R16 = 37.548 | D16 = 3.20 | N 9 = 1.51742 | ν 9 = 52.4 |
| R17 = −75.027 | D17 = 1.88 | | |
| R18 = −13.246 | D18 = 1.11 | N10 = 1.80518 | ν10 = 25.4 |
| R19 = −20.675 | D19 = 0.21 | | |
| R20 = 15.928 | D20 = 4.03 | N11 = 1.58913 | ν11 = 61.2 |
| R21 = −139.146 | D21 = 4.02 | | |
| R22 = 35.955 | D22 = 1.11 | N12 = 1.80518 | ν12 = 25.4 |
| R23 = 10.422 | D23 = 1.02 | | |
| R24 = 22.435 | D24 = 3.48 | N13 = 1.56732 | ν13 = 42.8 |
| R25 = −22.434 | D25 = 7.51 | | |
| R26 = ∞ | D26 = 6.40 | N14 = 1.51633 | ν14 = 64.2 |
| R27 = ∞ | | | |

-continued

| Variable | Focal Length | | |
|---|---|---|---|
| Distance | 10.0 | 22.8 | 57.0 |
| D 5 | 1.641 | 12.288 | 19.387 |
| D10 | 20.316 | 7.204 | 2.923 |
| D12 | 1.752 | 4.216 | 1.398 |

TABLE 1

| Conditional Expression | Numerical Example 1 | Numerical Example 2 | Numerical Example 3 | Numerical Example 4 |
|---|---|---|---|---|
| fL/fAL | −1.099 | 2.1149 | −0.2204 | −1.2999 |
| KW/KT | 1.00 | 1.00 | 1.00 | 1.00 |

Next, an embodiment of a video camera using the zoom lenses in some of the above-described embodiments as a photographing system will be described with reference to FIG. 23.

Figure 23:
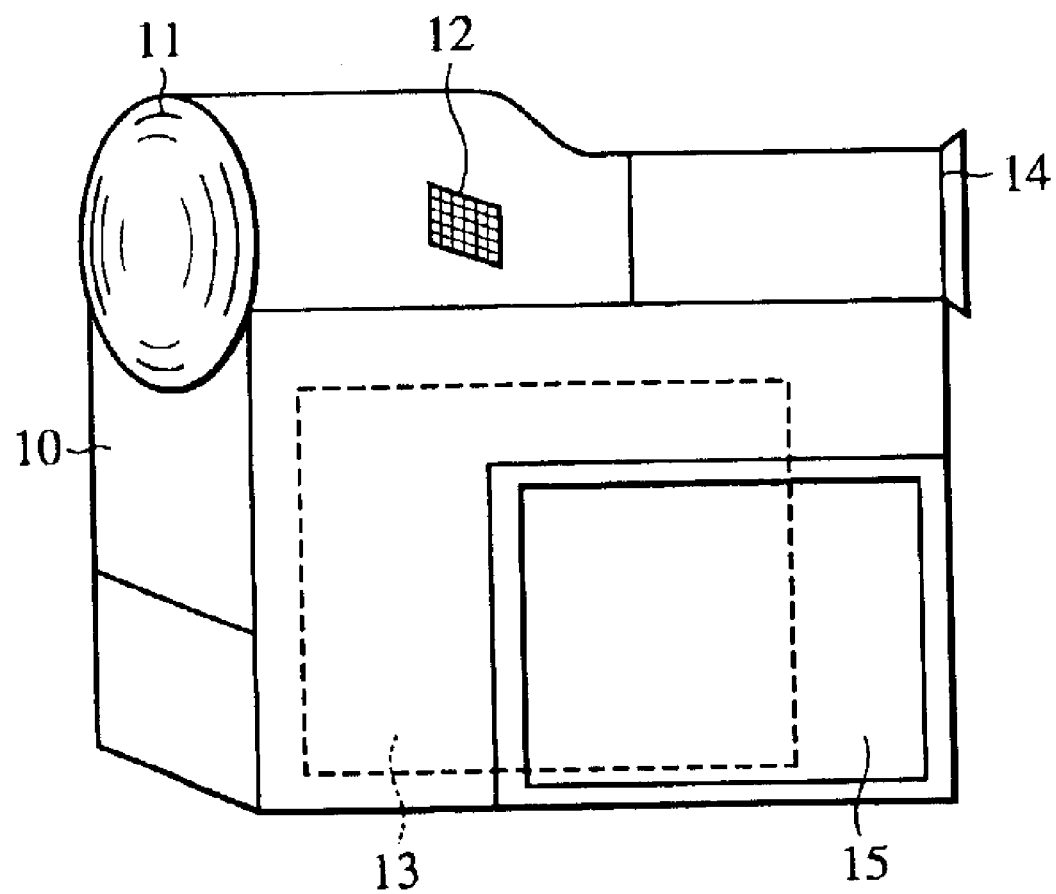
FIG. 23 is a schematic view showing the main section of a video camera according to the present invention.

Referring to FIG. 23, reference numeral 10 designates a video camera body; reference numeral 11 designates a photographing optical system constituted of the zoom lenses in some of the embodiments; reference numeral 12 designates a solid state image pickup device (photo-electric conversion device), such as a CCD, or a CMOS device that picks up a subject image by the photographing system 11; reference numeral 13 designates recording means that records the subject image picked up by the image pickup device 12; and reference numeral 14 designates a viewfinder for observing the subject image displayed on a display device (not shown). This display device comprises a liquid crystal panel, and displays the subject image formed on the image pickup device 12. Reference numeral 15 designates a liquid crystal display panel having a function equal to that of the aforementioned viewfinder.

As described above, by applying the zoom lenses according to some of the above-described embodiments to an optical device such as a video camera or the like, it is possible to implement a compact optical device with high optical performance.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom optical system, comprising:
   a variable power unit that performs a variable power operation while moving during zooming;
   a first focusing unit that performs focusing while moving, said first focusing unit being positioned in front of said variable power unit;
   a second focusing unit that performs focusing while moving, said second focusing unit being positioned at the back of said variable power unit;
   a sensor that detects the position of said first focusing unit; and
   a memory that stores the movement information of said second focusing unit during zooming according to the position of said first focusing unit, wherein said second focusing unit changes in the moving locus thereof during zooming, based on the position information about said first focusing unit detected by said sensor and the information from said memory.

2. A zoom optical system according to claim 1, further comprising a switch that switches between a first mode in which focusing is performed by said first focusing unit, and a second mode in which focusing is performed by said second focusing unit.

3. A zoom optical system according to claim 2, wherein, when said switch is switched to said first mode, then said second focusing unit moves to a predetermined position.

4. A zoom optical system according to claim 2, wherein said first mode is a manual focus mode in which focusing is manually performed, and wherein said second mode is an auto focus mode in which focusing is automatically performed according to the focus state.

5. A zoom optical system according to claim 2, wherein, in said first mode, said second focusing unit does not move for focusing, and wherein, in said second mode, said first focusing unit does not move for focusing.

6. A zoom optical system according to claim 1, in order from front to rear, further comprising:

a first unit of a positive optical power, said first unit being said first focusing unit;

a second unit of a negative optical power, said second unit moving for zooming;

a third unit of a negative optical power, said third unit moving for zooming;

a fourth unit of a positive optical power; and a fifth unit of a positive optical power, said fifth unit being said second focusing unit.

7. A zoom optical system according to claim 1, in order from front to rear, further comprising:

a first unit of a positive optical power, said first unit being said first focusing unit;

a second unit of a negative optical power, said second unit moving for zooming;

a third unit of a positive optical power, said third unit moving for zooming; and a fourth unit of a positive optical power, said fourth unit being said second focusing unit.

8. A zoom optical system according to claim 1, wherein the following conditional expression: $-3<fL/fAL<4$ is satisfied at all zoom positions where fL represents the focal length of the overall system at an arbitrary zoom position, and fAL represents the resultant focal length of systems in front of the second focusing lens unit, at said arbitrary zoom position.

9. A zoom optical system according to claim 1, wherein the following conditional expression: $0.9<KW/KT<1.1$ is satisfied where the focal length of the overall system at an arbitrary zoom position is represented by fL, the resultant focal length of systems in front of the second focusing unit at said arbitrary zoom position is represented by fAL, and fL/fAL=KL, and where the value of KL at a wide angle end is represented by KW, and the value of KL at a telephoto end is represented by KT.

10. A zoom optical system according to claim 1, wherein said zoom optical system forms an image on a solid state image pickup device.

11. A camera comprising:

the zoom optical system according to claim 1; and a solid state image pickup device that picks up an image formed by said zoom optical system.

* * * * *

UNITED STATES PATENT AND TRADEMARK OFFICE
CERTIFICATE OF CORRECTION

PATENT NO.    : 6,853,501 B2
DATED         : February 8, 2005
INVENTOR(S)   : Hitoshi Mukaiya It is certified that error appears in the above-identified patent and that said Letters Patent is hereby corrected as shown below:

Column 2,
Line 10, "intension" should read -- intention --.

Column 5,
Line 17, "showed" should read -- shown --
Lines 62 and 64, "view" should read -- views --

Column 12,
Line 52, "performed" should read -- be performed --.

Column 13,
Line 66, "each" should read -- each of --.

Column 14,
Line 33, "Asperical" should read -- Aspherical --.

Signed and Sealed this

Twelfth Day of July, 2005

JON W. DUDAS
*Director of the United States Patent and Trademark Office*